United States Patent
Hummel et al.

(10) Patent No.: US 9,228,589 B2
(45) Date of Patent: Jan. 5, 2016

(54) MATERIAL-CONVEYING DUCT WITH ADJUSTABLE GEOMETRY

(71) Applicant: Deere & Company, Moline, IL (US)

(72) Inventors: Justin E. Hummel, Des Moines, IA (US); Tom R. Walmsley, Bondurant, IA (US); John O. Rumohr, Pleasant Hill, IA (US); Scott D. Weber, Bondurant, IA (US)

(73) Assignee: Deere & Company, Moline, IL (US)

( * ) Notice: Subject to any disclaimer, the term of this patent is extended or adjusted under 35 U.S.C. 154(b) by 199 days.

(21) Appl. No.: 14/149,641

(22) Filed: Jan. 7, 2014

(65) Prior Publication Data

US 2015/0192132 A1    Jul. 9, 2015

(51) Int. Cl.
*B65G 53/04*    (2006.01)
*F04D 17/12*    (2006.01)

(52) U.S. Cl.
CPC .................................. *F04D 17/12* (2013.01)

(58) Field of Classification Search
CPC ........ A01D 46/08; A01D 46/12; F04D 17/12; B65G 53/54
USPC ............ 56/30, 28, 33; 406/100, 119, 10, 195, 406/196, 93; 209/552, 644, 676, 679
See application file for complete search history.

(56) References Cited

U.S. PATENT DOCUMENTS

| | | | |
|---|---|---|---|
| 4,606,177 A * | 8/1986 | Schlueter | A01D 46/08 19/64.5 |
| 5,394,679 A * | 3/1995 | Schlueter | A01D 46/12 56/30 |
| 6,253,923 B1 | 7/2001 | Felkins | |
| 6,272,821 B1 | 8/2001 | Wigdahl | |
| 6,321,516 B1 | 11/2001 | Wigdahl et al. | |
| 7,249,449 B2 * | 7/2007 | Goering | A01D 46/085 56/30 |
| 7,297,054 B2 | 11/2007 | Archer et al. | |
| 8,073,599 B2 | 12/2011 | Goering et al. | |

OTHER PUBLICATIONS

John Deere 7460 Cotton Stripper, http://www.deere.com/wps/dcom/en_US/products/equipment/cotton_harvesting/7460_cotton_stripper/7460_cotton_stripper.page#viewTabs, Admitted Prior Art.

* cited by examiner

*Primary Examiner* — Kevin P Shaver
*Assistant Examiner* — Michael J Melaragno
(74) *Attorney, Agent, or Firm* — Ingrassia, Fisher & Lorenz PC

(57) ABSTRACT

An adjustable material-conveying duct and a flow area adjustment device are described. The duct may include two wall sections, the second wall section having two mounting connections, oriented at an angle with respect to one another. When the second wall section is mounted to the first wall section via a first mounting connection, the wall sections form a first angle in a flow channel of the duct. When the second wall section is mounted to the first wall section via a second mounting connection, the wall sections form a second, different angle in the flow channel. A flow sensor, controller and automatic adjustment device may also be utilized to control the orientation of the wall sections.

20 Claims, 16 Drawing Sheets

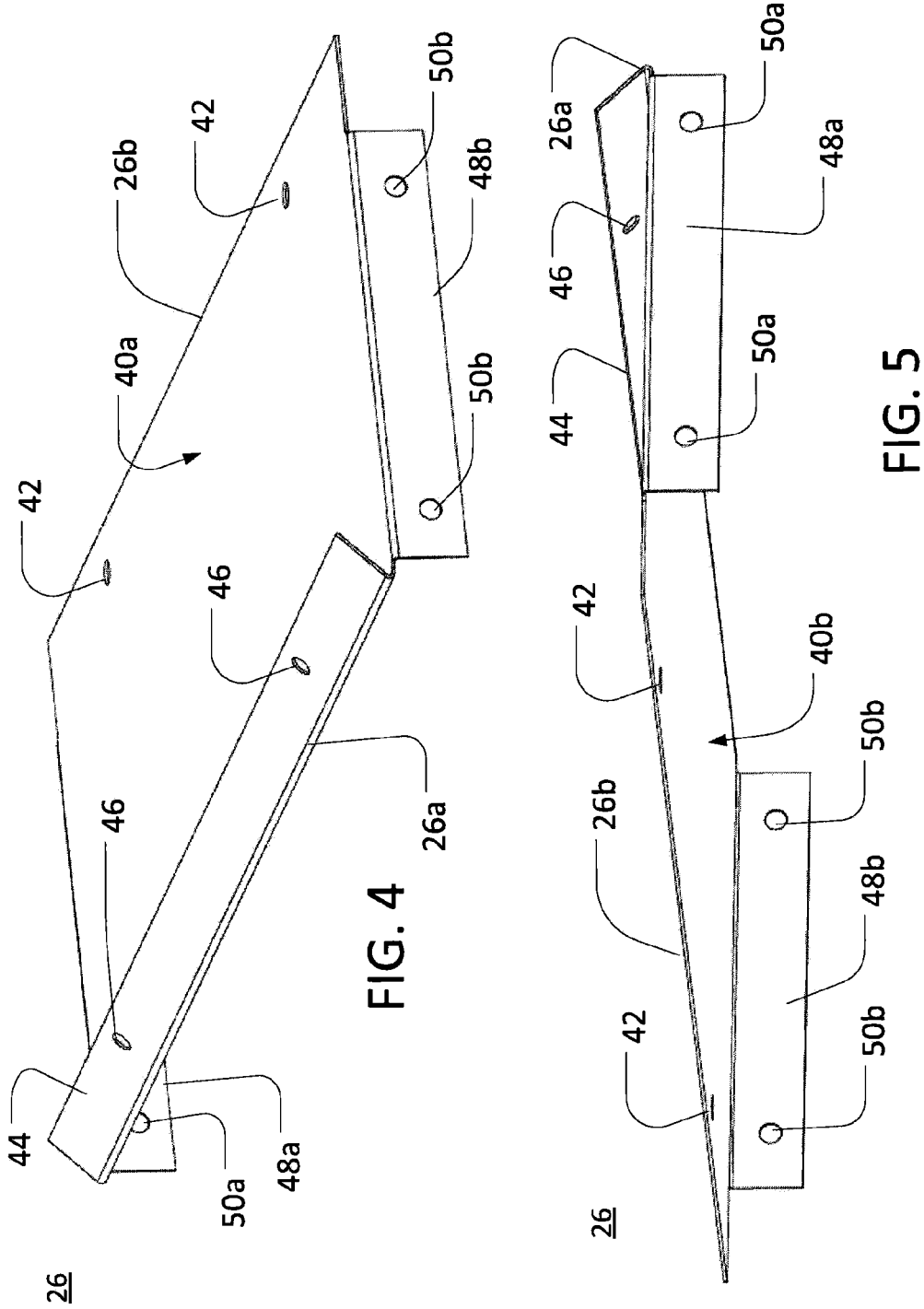

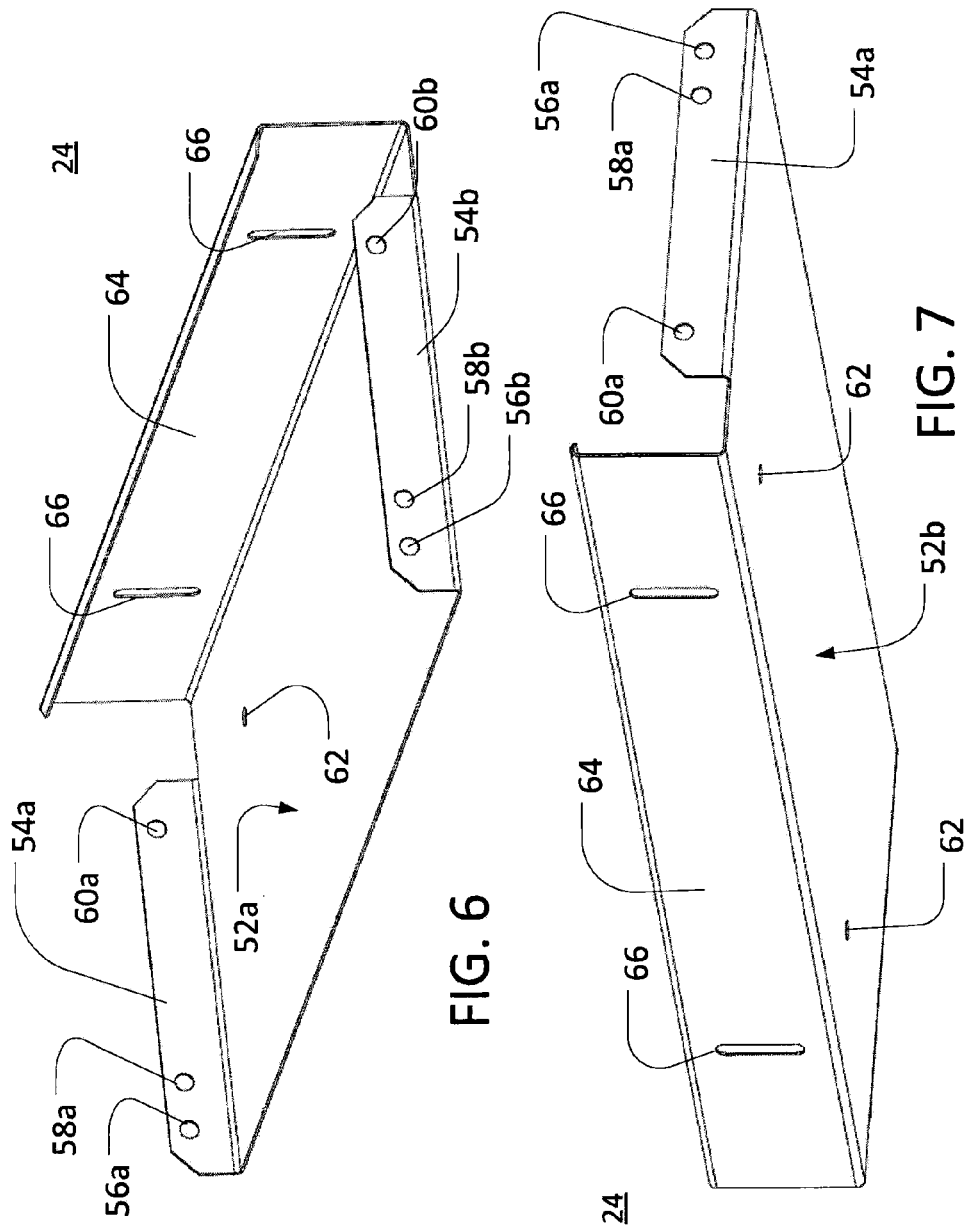

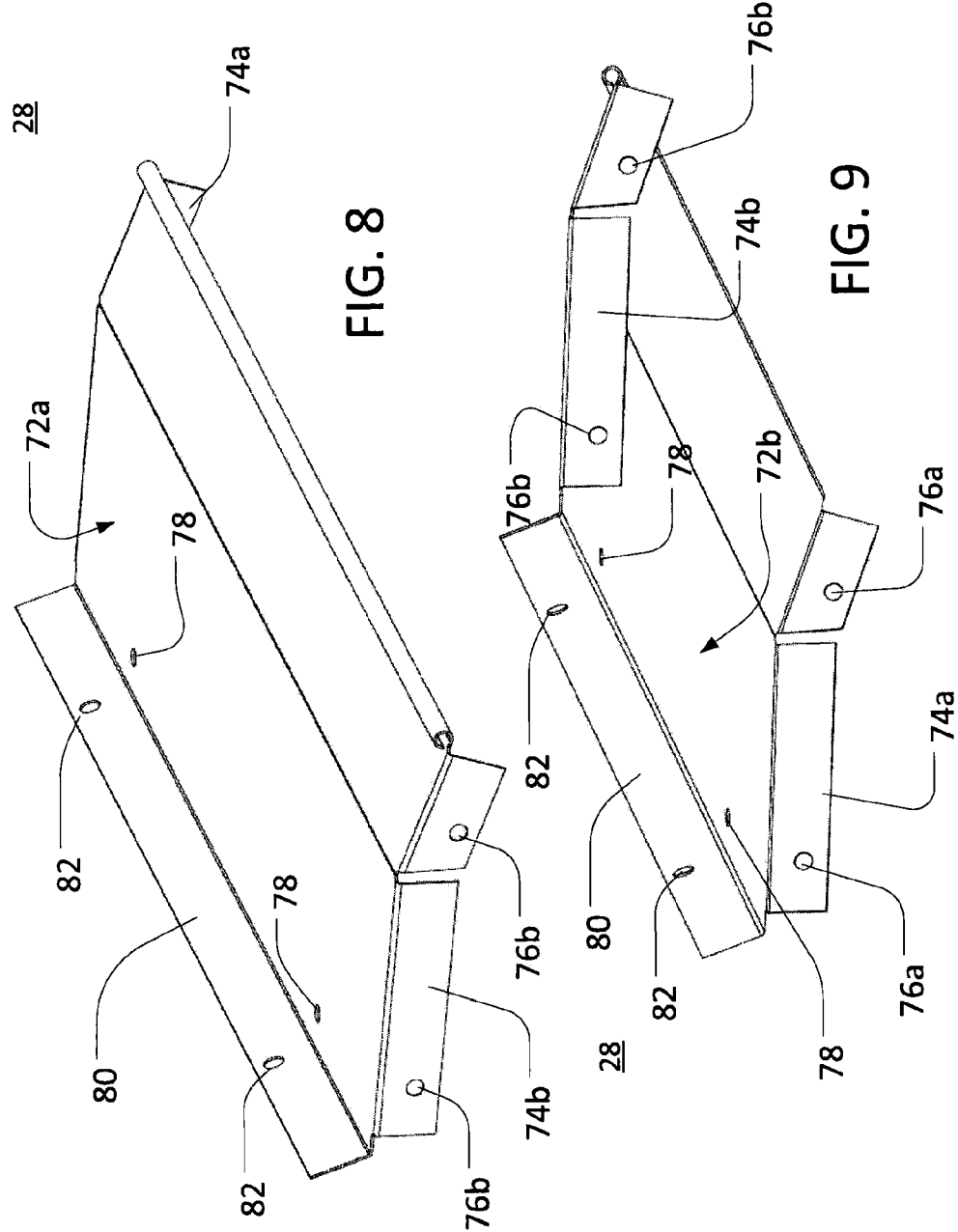

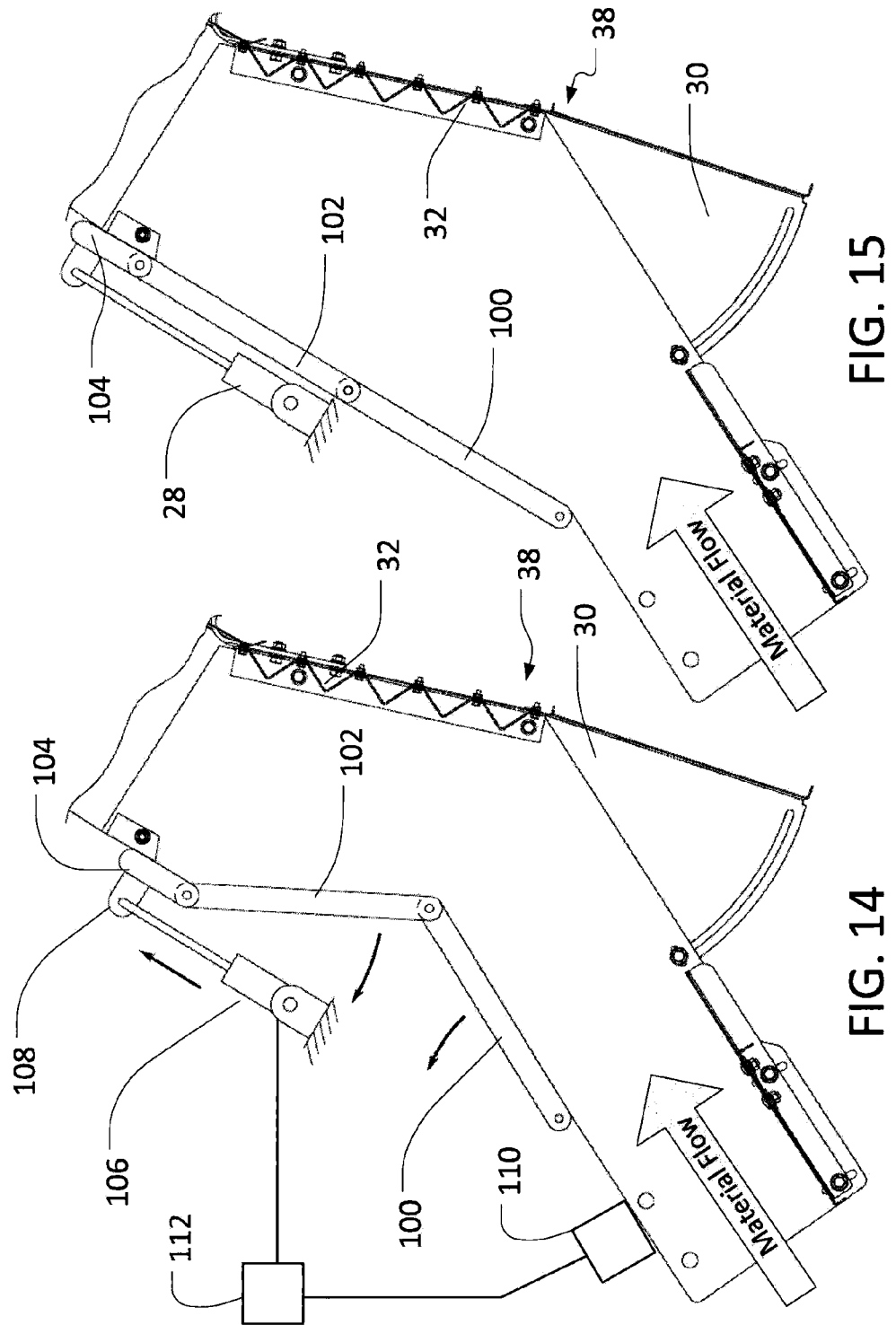

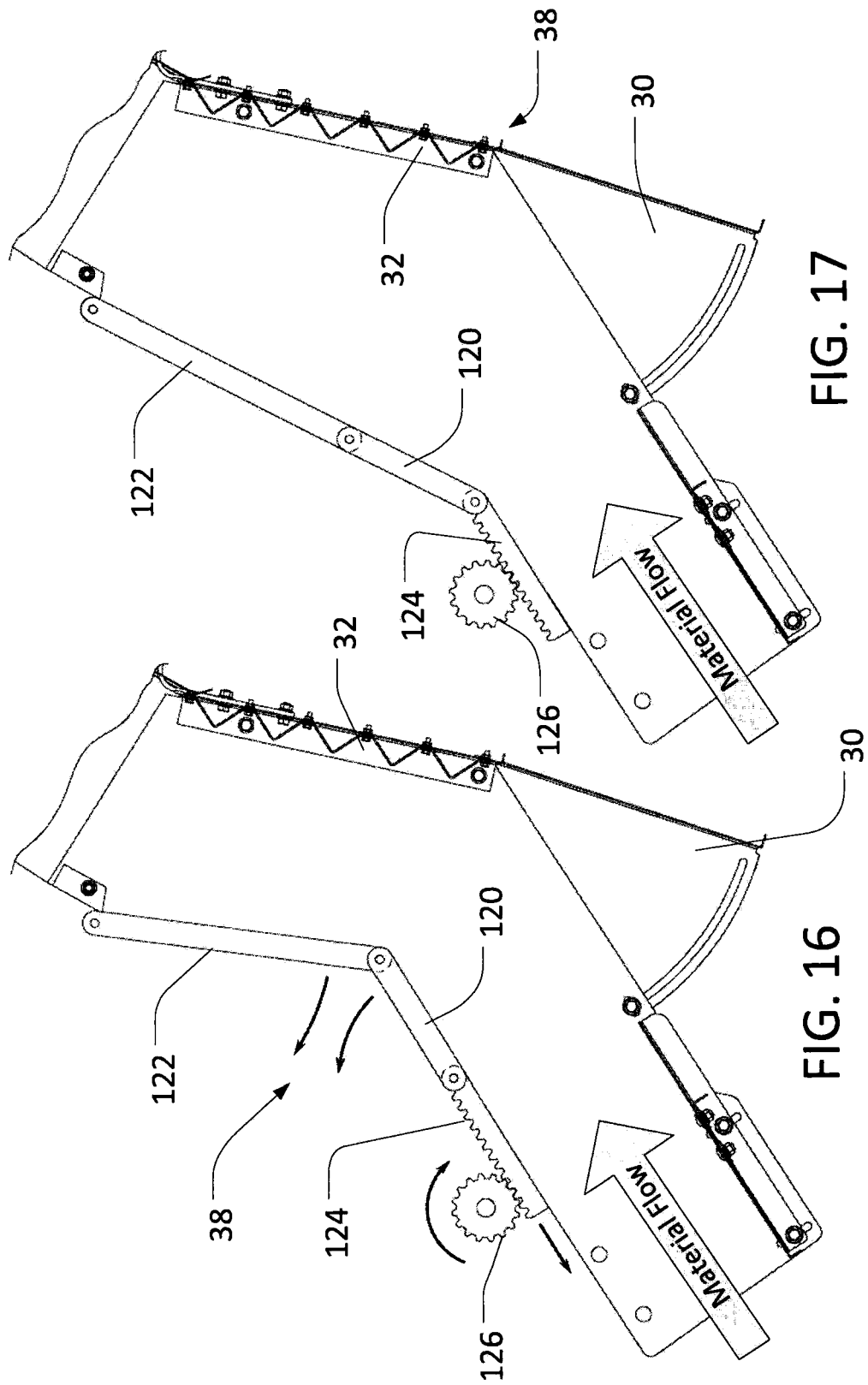

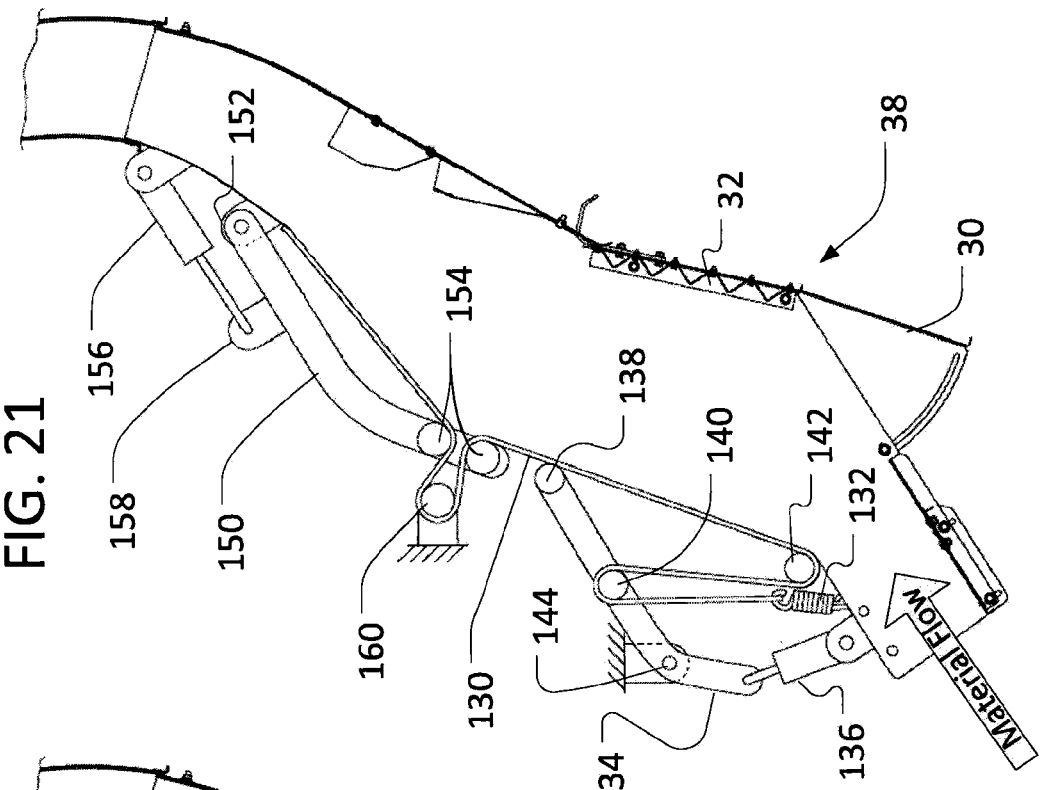
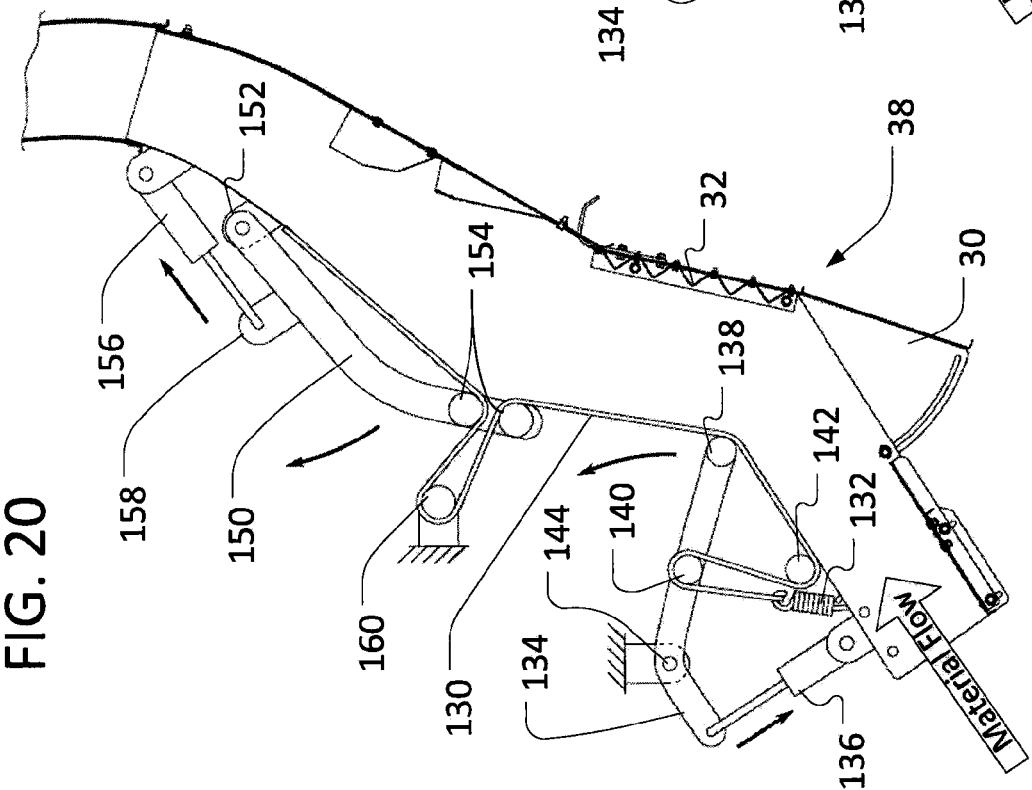

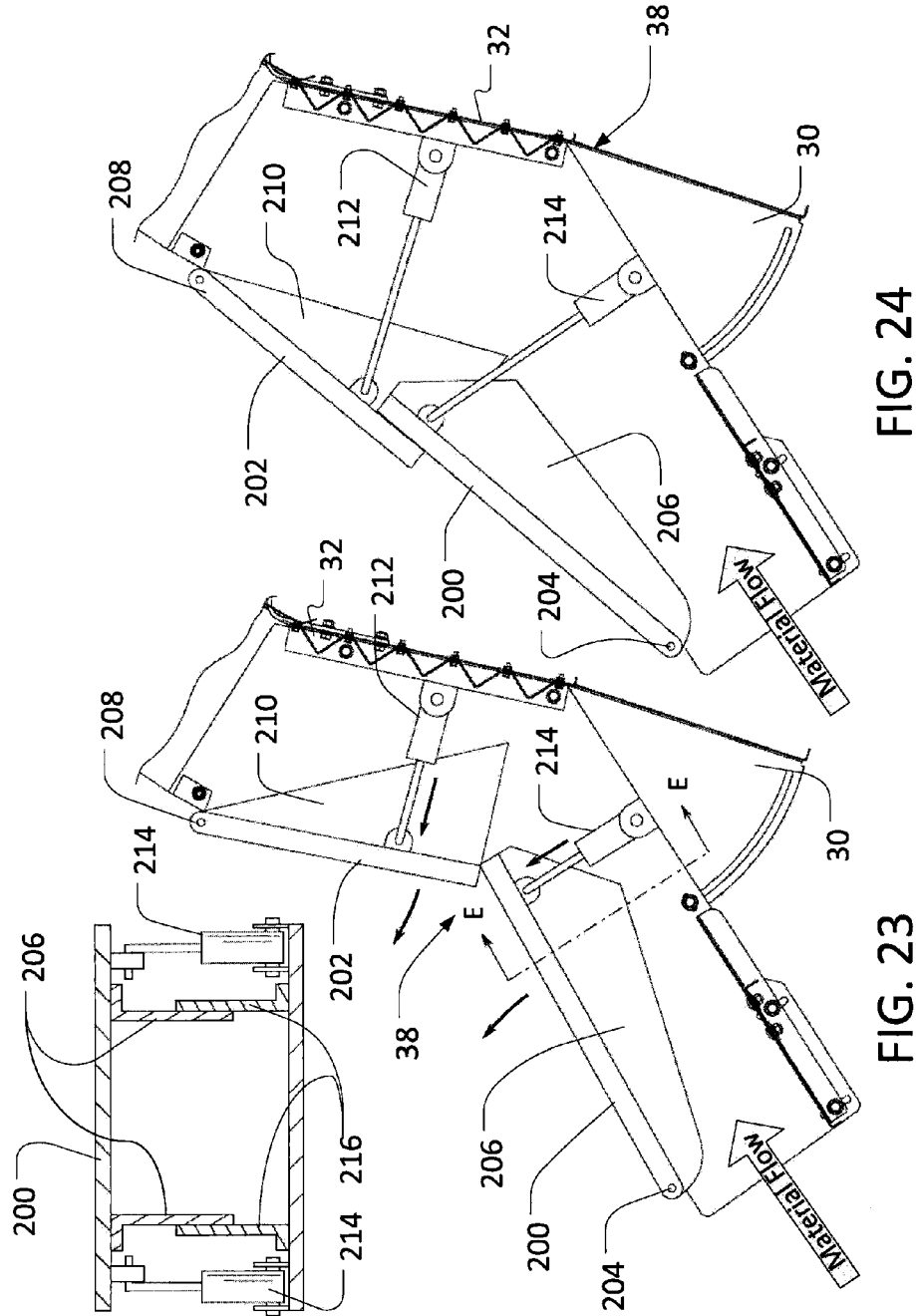

MATERIAL-CONVEYING DUCT WITH ADJUSTABLE GEOMETRY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to adjusting the geometry of a material-conveying duct, including adjusting the flow area of a separation duct for cotton strippers and other cotton-handling machines.

BACKGROUND OF THE DISCLOSURE

In various instances it may be useful to provide a duct with a variable flow geometry for conveying material. One potential application for such a duct may be in the separation of cotton from green bolls and other debris. For example, in a harvester such as a cotton stripper, cotton and other material (e.g., green bolls and other debris, which may be generally referred to as "trash") may be gathered from a field and routed to a separation duct. The separation duct may direct the cotton and other material through one or more turns in the duct between the duct entrance and the duct exit, in order to deposit material into an attached basket or other receptacle. As the material moves through these turns the lighter cotton may trace paths of generally smaller radii than the radii of the paths of heavier green bolls and other debris. This may beneficially allow for separation of the heavier green bolls and other debris from the lighter cotton.

Depending on the characteristics of the gathered material (e.g., cotton, green bolls, and other debris), however, turns for separating material (as described above) may also present a choke point for the duct. For example, although a tighter turn in a duct may lead to more significant separation of the heavier debris (i.e., because the debris cannot trace a small enough radius to follow the turn), this may also lead to clogging of the duct as cotton and other material bunches together at the relatively tight restriction of the turn. It may therefore be useful to provide a turn in a separation duct that is tight enough to provide appropriate material separation, while not so tight as to result in clogging. The flow of material through a given duct, however, may vary depending on a variety of factors including the type of pick-up header utilized for harvesting, the speed of travel of the harvesting vehicle, the type and yield of the cotton, the arrangement of the relevant field, and so on. Accordingly, one particular duct geometry (e.g., a separation curve of particular cross-section and curvature) may be well-suited to prevent clogging under one set of conditions but not under others.

In this light, it may be useful to provide a duct of variable geometry, in order to provide for effective separation of cotton from other material under a variety of conditions. Further, such a variable geometry duct may be useful in a variety of other applications, including other material separation operations.

SUMMARY OF THE DISCLOSURE

A flow area adjustment device is disclosed for adjusting the flow area of a material-conveying duct, including through adjusting the effective turning radius (or turning angle) of a separation turn included in a separation duct of a cotton harvesting and processing machine.

According to one aspect of the disclosure, a flow area adjustment device includes a first duct wall section bounding, at least in part, a flow channel of the duct over a first flow region, the first duct wall section having a first and a second mounting position with respect to the duct. The device includes a second duct wall section bounding, at least in part, the flow channel of the duct over a second flow region adjacent the first flow region. The second duct wall section has a first end with a first mounting connection and a second end with a second mounting connection, the second mounting connection being angled with respect to the first mounting connection. Each of the first and the second mounting connections of the second duct wall section are configured to mount the second duct wall section to one or more of the first duct wall section and a third duct wall section that is adjacent the second duct wall section.

With the first duct wall section in the first mounting position, the second duct wall section is mounted to the first duct wall section via the first mounting connection and is mounted to the third duct wall section via the second mounting connection, whereby the first duct wall section and the second duct wall section form an angle in the flow channel. With the first duct wall section in the second mounting position, the second duct wall section is mounted to the first duct wall section via the second mounting connection and is mounted to the third duct wall section via the first mounting connection, whereby the first duct wall section and the second duct wall section form a different angle in the flow channel.

One or more of the following features may also be included in the disclosed flow area adjustment device. The flow channel may include a separation flow channel for a cotton processing vehicle. A portion of the first or second duct wall sections may be located on a ceiling of a separation flow channel above a trash outlet. The third duct wall section may include a third mounting connection angled with respect to the flow channel at the third duct wall section, the second and third duct wall sections being mounted together via the third mounting connection and the first mounting connection when the first duct wall section is in the second mounting position and the second duct wall section is mounted to the first duct wall section via the second mounting connection.

In the first mounting position, the first duct wall section may be mounted to a side wall of the duct at a first location and in the second mounting position the first duct wall section is mounted to the side wall of the duct at a second location different from the first location. The first duct wall section may include a bracket extending away from the flow channel, the first duct wall section being mounted to the second duct wall section via the bracket and the first mounting connection of the second duct wall section when the first duct wall section is in the first mounting position. With the first duct wall section in the second mounting position and the second duct wall section mounted to the first duct wall section via the second mounting connection, the first duct wall section may be substantially parallel to the second duct wall section. One or more of the first, the second, and the third duct wall sections may be formed from sheet metal. The angle between the first and second mounting connections may be an acute angle.

According to another aspect of the disclosure, a flow area adjustment device includes a first duct wall section including a first flow channel surface bounding, at least in part, a flow channel of the duct over a first flow region. The first duct wall section has a first and a second mounting position with respect to the duct. The device includes a second duct wall section including a second flow channel surface bounding, at least in part, the flow channel of the duct over a second flow region adjacent the first flow region. The second duct wall section further includes a first mounting tab angling away from the second flow channel surface, and a first mounting connection parallel, at least in part, to the second flow channel surface. The device also includes a third duct wall section including a third flow channel surface bounding, at least in part the flow channel of the duct over a third flow region adjacent the second flow region. The third duct wall section includes a second mounting tab angling away from the third flow channel surface, and a second mounting connection parallel, at least in part, to the third flow channel surface.

With the first duct wall section in the first mounting position, the second duct wall section is mounted to the first duct wall section via the first mounting tab and is mounted to the third duct wall section via the first mounting connection and the second mounting connection, whereby the first duct wall section and the second duct wall section form a first angle in the flow channel. With the first duct wall section in the second mounting position, the second duct wall section is mounted to the first duct wall section via the first mounting connection and is mounted to the third duct wall section via the first mounting tab and the second mounting tab, whereby the first duct wall section and the second duct wall section form a second angle in the flow channel different from the first angle.

One or more of the following features may also be included. The flow channel may include a separation flow channel for a cotton processing vehicle. A portion of the first or second duct wall sections may be located on a ceiling of a separation flow channel above a trash outlet. The first duct wall section may include a bracket extending away from the flow channel, the first duct wall section being mounted to the second duct wall section via the bracket and the first mounting connection of the second duct wall section when the first duct wall section is in the first mounting position. In the first mounting position, the first duct wall section may be mounted to a side wall of the duct at a first location and in the second mounting position the first duct wall section is mounted to the side wall of the duct at a second location different from the first location. With the first duct wall section in the second mounting position and the second duct wall section mounted to the first duct wall section via the second mounting connection, the first duct wall section may be substantially parallel to the second duct wall section.

According to yet another aspect of the disclosure, a flow area adjustment device includes a flow sensor, a controller, and a first and a second duct wall section. The first duct wall section bounds, at least in part, a flow channel of a duct over a first flow region. The second duct wall section bounds, at least in part, the flow channel over a second flow region adjacent the first flow region. A duct wall adjustment device is configured to change the orientation of the first or the second duct wall sections (or both) based upon, at least in part, input from the flow sensor and the controller.

One or more of the following features may also be included. The flow area adjustment device may include a rotatable connection between the first and the second duct wall sections. The device may also include a third duct wall section rotatably mounted to the second duct wall section and slidably mounted to the duct, and a piston device included in the duct wall adjustment device. The piston device may be configured to controllably move the third duct wall section along the slidable mounting of the third wall section to the duct based upon, at least in part, the input from the flow sensor and the controller. At a first extension of the piston device the first and the second duct wall sections may form a first angle in the flow channel. At a second extension of the piston device the first and the second duct wall sections may form a second angle in the flow channel that is different from the first angle.

The flow area adjustment device may include a rotatable connection between the first and the second duct wall sections, a third duct wall section and a driven gear. The third duct wall section may be rotatably mounted to the first duct wall section and slidably mounted to the duct, and may include a gear-engaging structure. The drive gear may be engaged with the gear-engaging structure of the third wall section, the driven gear being configured to controllably move the third duct wall section along the slidable mounting of the third wall section to the duct based upon, at least in part, the input from the flow sensor and the controller. At a first position of the third duct wall section the first and the second duct wall sections may form a first angle in the flow channel. At a second position of the third duct wall section the first and the second duct wall sections may form a second angle in the flow channel that is different from the first angle.

The flow area adjustment device may include a flexible duct wall including the first and the second duct wall sections, a first piston device included in the duct wall adjustment device, and a first pivoting member in contact at a first end of the pivoting member with the flexible duct wall. The contact of the first end of the first pivoting member with the flexible duct wall may separate the first duct wall section from the second duct wall section. The first pivoting member may be mounted to the first piston device at a second end of the first pivoting member and to a first pivot mount at a first pivot point between the first and the second ends of the first pivoting member. At a first extension of the first piston device based upon, at least in part, the input from the flow sensor and the controller, the first pivoting member may cause the first and the second duct wall sections to form a first angle in the flow channel. At a second extension of the first piston device based upon, at least in part, the input from the flow sensor and the controller, the first pivoting member may cause the first and the second duct wall sections to form a second angle in the flow channel that is different from the first angle.

The flow area adjustment device may include a second piston device included in the duct wall adjustment device, and a second pivoting member including a passage for the flexible duct wall at a third end of the second pivoting member. The flexible duct wall may pass from the flow channel through the passage and around an anchor point that is opposite the passage from the flow channel, the second pivoting member being mounted to a second pivot mount at a fourth end of the second pivoting member and to a second piston device between the third and the fourth ends of the second pivoting member. At a third extension of the second piston device based upon, at least in part, the input from the flow sensor and the controller, the second pivoting member may cause a first length of the flexible duct wall to be held between the anchor point and the passage. At a fourth extension of the second piston device based upon, at least in part, the input from the flow sensor and the controller, the second pivoting member may cause a second length of the flexible duct wall to be held between the anchor point and the passage.

The flow area adjustment device may include a first slidable connection between the first duct wall section and the duct and a second slidable connection between the first duct wall section and the duct, one or more piston devices included in the duct wall adjustment device, a first rotatable connection between the first duct wall section and the second duct wall connection, and a second rotatable connection between the second duct wall section and the duct. The first slidable connection may allow the first duct wall section to slide in a first direction with respect to the duct and the second slidable connection may allow the first duct wall section to slide in a second direction with respect to the duct. The one or more piston devices may be configured to move the first duct wall section along one or more of the first and the second slidable connections. At a first extension of the one or more piston devices based upon, at least in part, the input from the flow sensor and the controller, the first and the second rotatable connections and the first and the second slidable connections may cause the first and the second duct wall sections to form a first angle in the flow channel. At a second extension of the one or more piston devices based upon, at least in part, the input from the flow sensor and the controller, the first and the second rotatable connections and the first and the second slidable connections may cause the first and the second duct wall sections to form a second angle in the flow channel that is different from the first angle.

The flow area adjustment device may include a first duct ceiling section and a first side wall extension, each included in the first duct wall section, a first end of the first duct wall section being rotatably mounted to the duct. The device may also include a second duct ceiling portion and a second side wall extension, each included in the second duct wall section, a second end of the second duct wall section being rotatably mounted to the duct. The device may also include a first and a second piston device included in the duct wall adjustment device. The first piston device may be fixed with respect to the duct at a first location, and mounted to the first duct wall section. The second piston device may be fixed with respect to the duct at a second location, and mounted to the second duct wall section. At a first extension of the first and the second piston devices based upon, at least in part, the input from the flow sensor and the controller, the first and the second duct wall sections may form a first angle in the flow channel. At a second extension of the first and the second piston devices based upon, at least in part, the input from the flow sensor and the controller, the first and the second duct wall sections may form a second angle in the flow channel that is different from the first angle. At the second extension of the first and the second piston devices, the first side wall extension may overlap with the second side wall extension.

The details of one or more embodiments are set forth in the accompanying drawings and the description below. Other features and advantages will become apparent from the description, the drawings, and the claims.

BRIEF DESCRIPTION OF THE DRAWINGS

FIGS. 4 and 5 are perspective views of an example duct wall section included in the duct of FIG. 3;

FIGS. 6 and 7 are perspective views of another example duct wall section included in the duct of FIG. 3;

FIGS. 8 and 9 are perspective views of yet another example duct wall section included in the duct of FIG. 3;

FIGS. 14 and 15 are cross-sectional views of the duct of FIG. 2, taken along plane A-A indicated in FIG. 2, showing a first example automated flow area adjustment device;

FIGS. 16 and 17 are cross-sectional views of the duct of FIG. 2, taken along plane A-A indicated in FIG. 2, showing a second example automated flow area adjustment device;

FIGS. 20 and 21 are cross-sectional views of the duct of FIG. 2, taken along plane A-A indicated in FIG. 2, showing a fourth example automated flow area adjustment device;

FIGS. 23 and 24 are cross-sectional views of the duct of FIG. 2, taken along plane A-A indicated in FIG. 2, showing a sixth example automated flow area adjustment device; and FIG. 25 is a cross-sectional view of the duct of FIG. 23, taken along plane E-E indicated in FIG. 23.

Like reference symbols in the various drawings indicate like elements.

DETAILED DESCRIPTION

Figure 1:
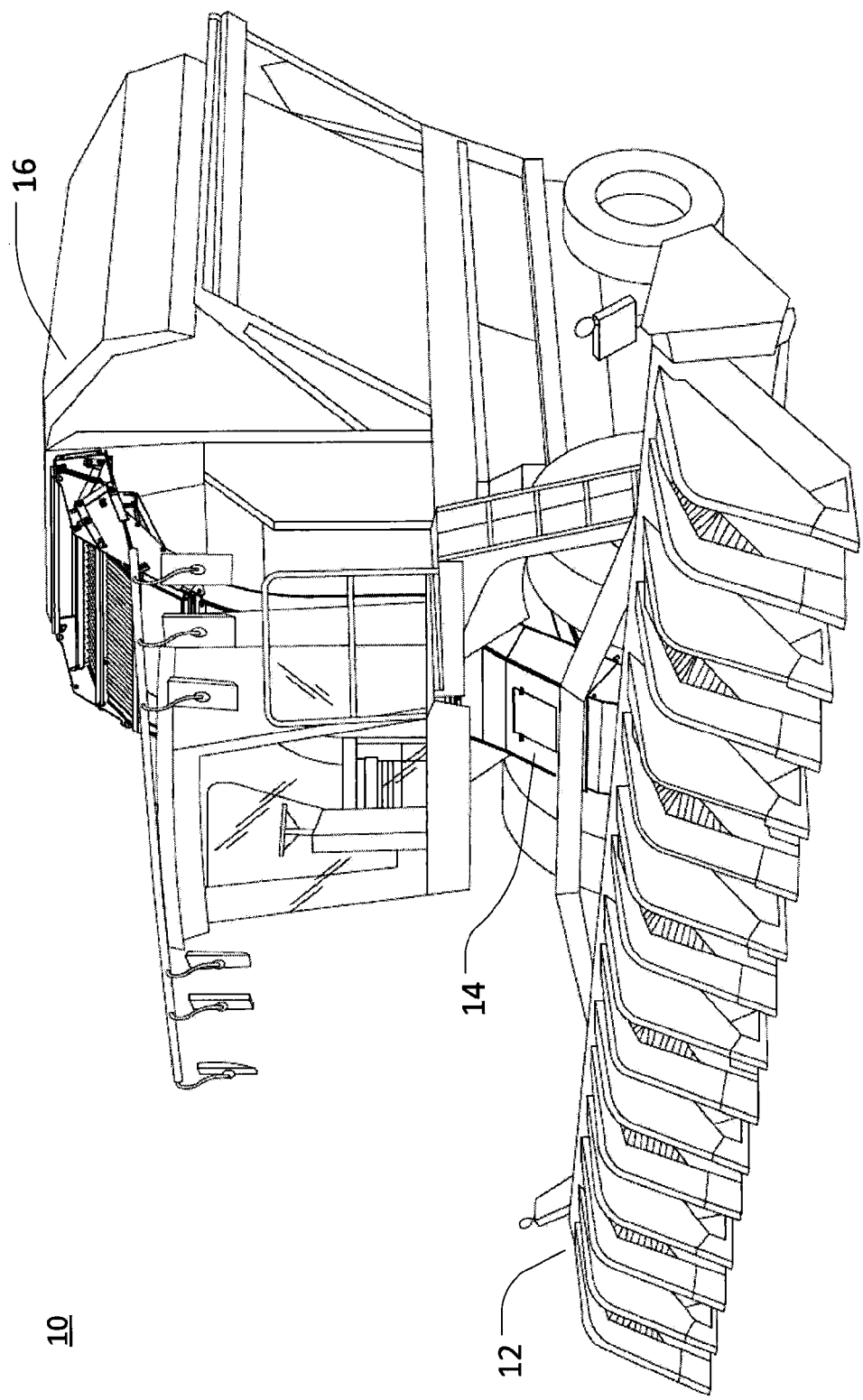
FIG. 1 is a perspective view of an example vehicle in which the disclosed flow area adjustment device.

The following describes one or more example embodiments of the disclosed material-conveying duct and related adjustment device, as shown in the accompanying figures of the drawings described briefly above. Various modifications to the example embodiments may be contemplated by one of skill in the art.

As also noted above, in various machines for processing harvested material it may be useful to provide a duct of variable flow area, including over one or more turns included in the duct. In certain embodiments, it may be useful to provide a duct design that allows for easy (and, potentially, automatic) in-field adjustment of duct geometry. In certain embodiments, such a variable flow area duct may be useful as a separation duct for a cotton stripper or other cotton harvester or processor (e.g., a combination cotton picker and stripper). The examples below may generally focus on such embodiments. It will be understood, however, that the principles of this disclosure may also be applied to other ducts in other vehicles or systems.

A variable flow area duct may be provided in a variety of ways. In certain embodiments, a panel of a duct may be configured to be attached to the duct in a number of different orientations, each of which may result in a different duct flow geometry. For example, one or more appropriately angled mounting tabs may be provided on a first removable sheet metal (or other) duct wall panel or section, in order to mount the panel to the duct. When the tabs are used to mount the panel to the duct in a first orientation, the panel may provide a first duct geometry (e.g., a turn in the duct with a first approximate turning radius or turning angle, or a first cross-sectional flow area). Further, when the tabs are used to mount the panel to the duct in another orientation (e.g., an orientation of the panel that is rotated 180 degrees from the first orientation), the panel may provide a different duct geometry (e.g., a turn with a different approximate turning radius or turning angle, or a different cross-sectional flow area). This may be further facilitated, for example, by appropriately configured mounting connections (e.g., other angled mounting tabs) on portions of the duct that are adjacent to the first panel. For example, another panel upstream (or downstream) of the first panel may be configured also to mount to the duct in different orientations, including different orientations that correspond to the other panel being mounted to one or another of various mounting tabs on the adjacent first panel and thereby forming various angles (or other interface geometries) with the first panel. In this way, this other panel may also provide (in conjunction with the first panel) different duct geometry depending on its current orientation.

In certain embodiments, these (and other) panels may be manually adjustable. For example, an operator of a cotton stripper employing such a duct may be able to use standard tools to re-orient the panels (and thereby change the geometry of the duct), even while the cotton stripper is in the field.

In certain embodiments, automatic adjustment of flow geometry may be provided. For example, various configurations of hinged, slidable, and/or flexible panels may be adjusted with various control devices (e.g., pistons, gears, and so on, which may move various panels between different orientations) in order to adjust duct geometry. In certain embodiments, a flow sensor (or other sensor of material in the relevant duct or related information) may be provided, which may operate in conjunction with a controller to direct adjustment of the panels by the control devices, based upon characteristics of the flow through the duct. In this way, for example, as the flow of cotton and other material through a separation duct changes, the duct geometry may be automatically varied appropriately (e.g., a duct section automatically widened or a turning angle automatically adjusted in response to an increased material flow rate).

Referring now to FIG. 1, the various adjustable geometry flow ducts and adjustment devices contemplated by this disclosure may be implemented in a cotton harvesting machine. For example, cotton stripper 10 may include header 12 to gather cotton (and other material, including green bolls and other debris). The gathered material may be routed (e.g., via one or more augers (not shown)) to separation duct 14, which may generally convey the material towards basket 16 for storage or further processing. In certain embodiments, duct 14 may be a variable geometry duct (e.g., a duct with a flow passage of variable area). As also noted above, and although various embodiments below will be presented in the context of a cotton stripper (or similar harvester), it will be understood that such a duct may also be implemented in a variety of other settings, including in hybrid cotton picker/stripper vehicles and other agricultural and non-agricultural vehicles.

Figure 2:
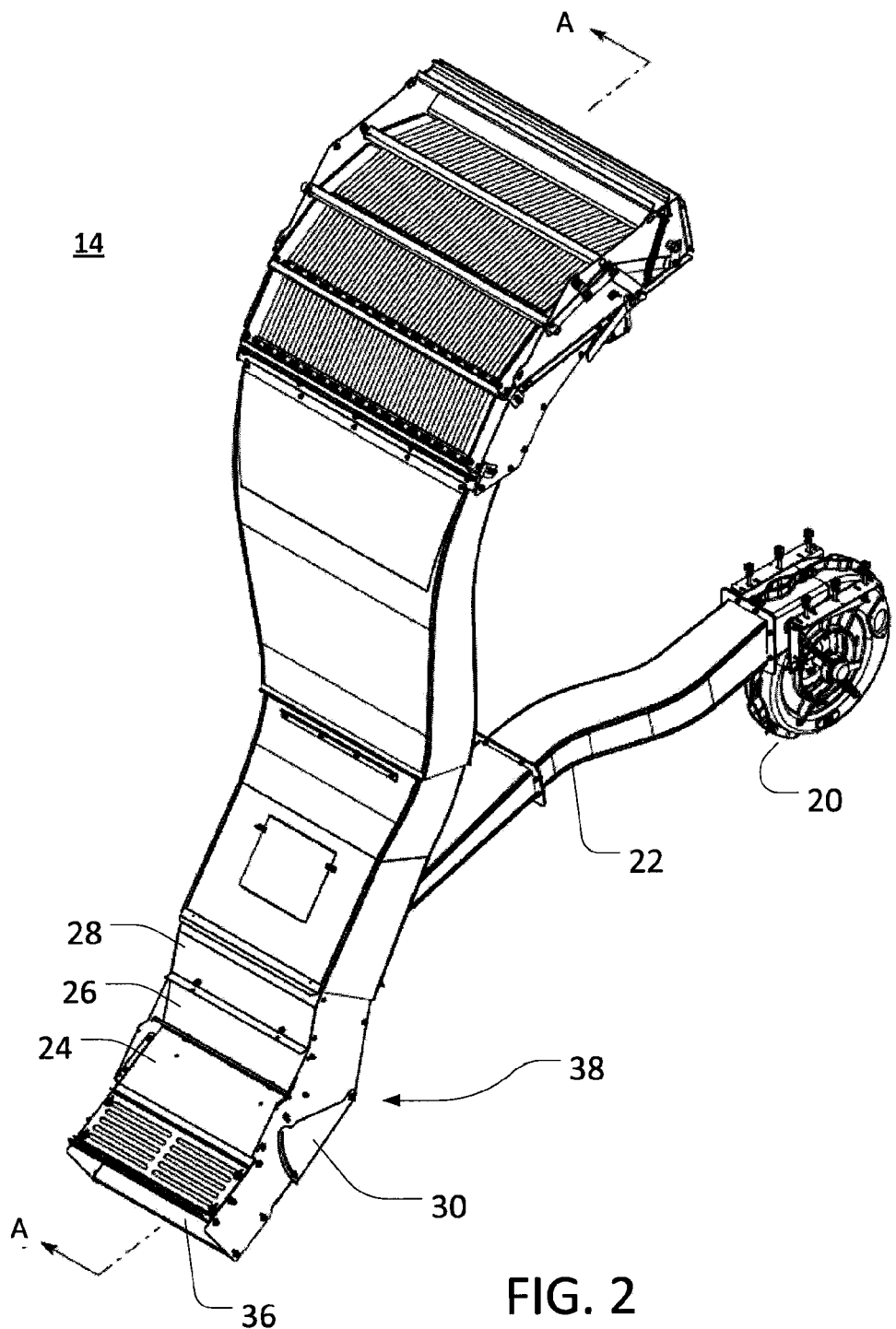
FIG. 2 is a perspective view of a material-conveying duct included in the example vehicle of FIG. 1.
Figure 3:
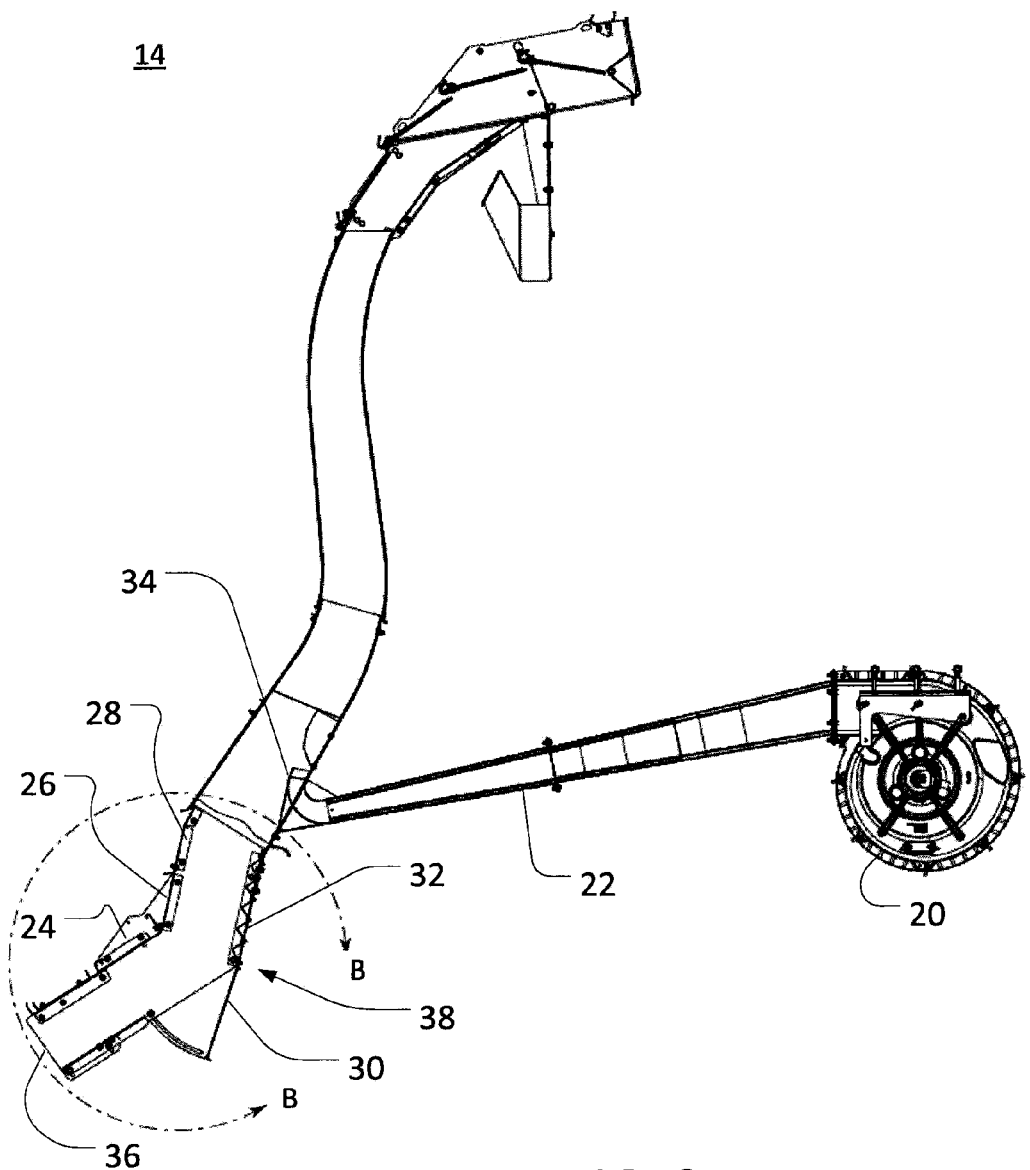
FIG. 3 is a cross-sectional view of the duct of FIG. 2, taken along plane A-A indicated in FIG. 2.

Referring also to FIGS. 2 and 3, flow of air through duct 14 may be provided by blower assembly 20, which may direct pressurized air through fan duct 22 and into duct 14. Curved entrance port 34 may generally direct this air flow upward through duct 14. This may create an effective vacuum in the lower portion of duct 14, which may pull material into entrance 36 of duct 14 and through separation turn 38, which is partially defined by panels 24, 26 and 28 (each of which may be considered as an example of a duct wall section). (It will be understood that other systems may also be employed to move material through the duct.) As also described above, as material moves through separation turn 38, heavier material may travel along a generally wider turning radius (or follow a generally larger turning angle) than lighter material. In the context of cotton stripping, for example, the lighter cotton may travel closer to the top of duct 14 (e.g., closer to panels 24, 26, and 28) whereas the heavier trash (e.g., green bolls and other debris) may travel closer to the bottom of duct 14. This may allow for separation of the trash from the cotton.

For example, stepped deflector 32 may be provided on a back wall of separation turn 38, with a trash outlet (e.g., trash chute 30) provided below deflector 32. In this way, for example, as the trash travels along its wider path through separation turn 38, the trash may be intercepted by deflector 32 and tumble down and out of chute 30. Meanwhile, the lighter cotton may continue up duct 14 (as pulled, and then blown, by the air flow from port 34) and into basket 16.

Due to potential variations in the composition and flow of material through duct 14, it may be useful for separation turn 38 (or various other regions of duct 14 or another flow duct) to have an adjustable flow geometry. In certain embodiments, this may be facilitated by appropriate configuration of panels 24, 26, and 28 (or various other adjustment devices).

Referring now to FIGS. 4 and 5, in certain embodiments panel 26 may be a sheet metal panel (although various other constructions may be possible). Panel 26 may include a main portion including inner flow channel surface 40b, which may define (at least in part) the ceiling (or other portion) of duct 14 along panel 26. With a sheet metal construction, inner flow channel surface 40b may be formed from the same sheet of metal that defines outer wall 40a of panel 26, or of a different sheet of metal. Panel 26 may be mounted to duct 14 via side brackets 48a and 48b, which may include various types of mounting connections. For example, brackets 48a and 48b may include, respectively, mounting holes 50a and 50b, configured to receive a bolt or pin to secure panel 26 to duct 14 (e.g., via corresponding mounting holes in duct 14). In certain embodiments, brackets 48a and 48b may be generally symmetrical or similar, so that panel 26 may be mounted to duct 14 with brackets 48a and 48b, respectively, on either side of duct 14 (or, potentially, with either surface 40b or wall 40a on the interior of duct 14).

Panel 26 may also include various mounting connections for securing panel 26 to adjacent panels of duct 14 (e.g., panels 24 and 28). For example, panel 26 may include mounting holes 42 in a flat portion of outer wall 40a (and inner surface 40b) near end 26b of panel 26. Panel 26 may also include mounting tab 44, which may extend away from outer wall 40a (and inner surface 40b) at an angle and may include mounting holes 46. In this way, the mounting connection provided by tab 44 may be oriented at an angle with respect to (e.g., may generally not be parallel with) the mounting connection provided by mounting holes 42 and outer wall 40a. It will be understood that various angles may be selected, with respect to the orientation of tab 44, and that the mounting connection opposite tab 44 (e.g., in FIGS. 4 and 5, mounting holes 42 on wall 40a) may take a variety of configurations, including various tabs or other projections extending way from wall 40a.

In the configuration depicted in FIGS. 4 and 5, panel 26 may be mounted to duct 14 in at least two orientations. In a first orientation, end 26a may be the downstream edge of panel 26 and end 26b may be the upstream edge of panel 26. Similarly, in a second orientation, end 26a may be the upstream edge of panel 26 and end 26b may be the downstream edge. As such, in certain embodiments, when panel 26 is in the first orientation tab 44 may be mounted to a mounting connection on panel 24 and holes 42 may be mounted to a mounting connection on panel 28. Likewise, when panel 26 is in the second orientation tab 44 may be mounted to a mounting connection on panel 28 and holes 42 may be mounted to a mounting connection on panel 24.

Referring also to FIGS. 6 and 7, an embodiment of panel 24 is represented. Panel 24 may include an inner flow channel surface 52b, which may define (at least in part) the ceiling (or other portion) of duct 14 along panel 24. With a sheet metal construction, inner flow channel surface 52b may be formed from the same sheet of metal that defines outer wall 52a of panel 24 (or a different sheet). Mounting holes 62 may be provided in surface 52b/outer wall 52a. Panel 24 may be mounted to duct 14 via side brackets 54a and 54b, which may include various types of mounting connections. For example brackets 54a and 54b may include, respectively, mounting holes 56a and 56b, 58a and 58b, and 60a and 60b, configured to receive a bolt or pin to secure panel 24 to duct 14 in various orientations (e.g., via corresponding mounting holes in duct 14). Panel 24 may also include bracket 64 extending away from the local flow channel of duct 14. Bracket 64 may include mounting slots 66, which may be configured to receive a pin or bolt in various locations to adjustably connect bracket 70 (and panel 24) to various other components.

Referring also to FIGS. 8 and 9, panel 28 may include an inner flow channel surface 72b, which may define (at least in part) the ceiling (or other portion) of duct 14 along panel 28. With a sheet metal construction, inner flow channel surface 72b may be formed from the same sheet of metal that defines outer wall 72a of panel 28 (or a different sheet). Mounting holes 78 may be included in surface 72b/outer wall 72a. Panel 28 may be mounted to duct 14 via side brackets 74a and 74b, which may include various types of mounting connections. For example brackets 74a and 74b may include, respectively, mounting holes 76a and 76b, configured to receive a bolt or pin to secure panel 24 to duct 14 (e.g., via corresponding mounting holes in duct 14). As depicted, brackets 74a and 74b may be formed of two (or more) separate pieces in order to facilitate a bend (or other geometry) in panel 28.

Panel 28 may also include an angled mounting connection. For example, panel 28 may include tab 80 extending at an angle away from the flow channel of duct 14 that is defined, at least in part, by panel 28. Tab 80 may include mounting holes 82, configured to receive a bolt or pin to secure panel 28 to various other components.

Figure 10:
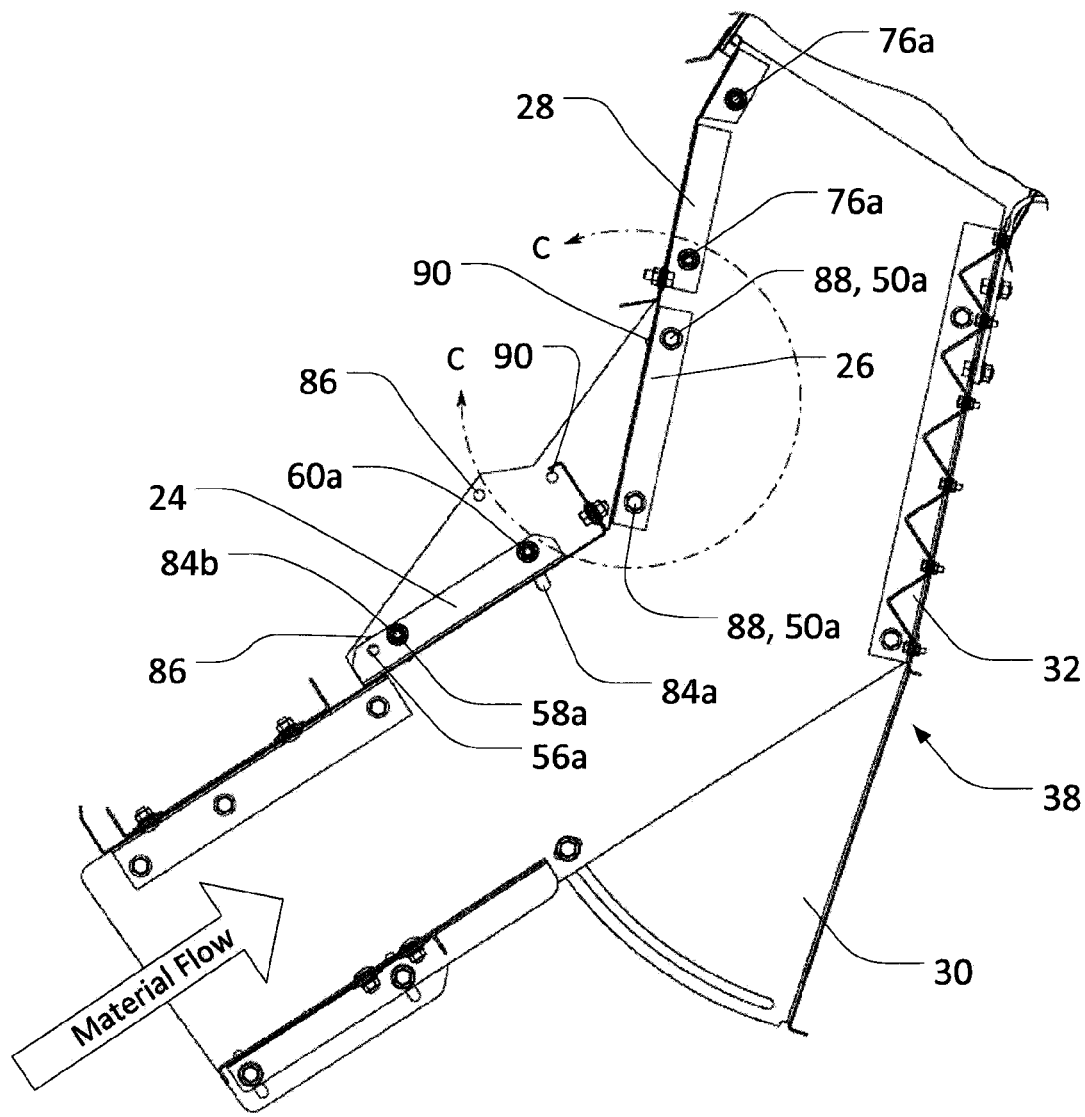
FIG. 10 is an enlarged view of region B-B indicated in FIG. 3, with the example duct wall sections of FIGS. 4-9 in a first configuration.
Figure 11:
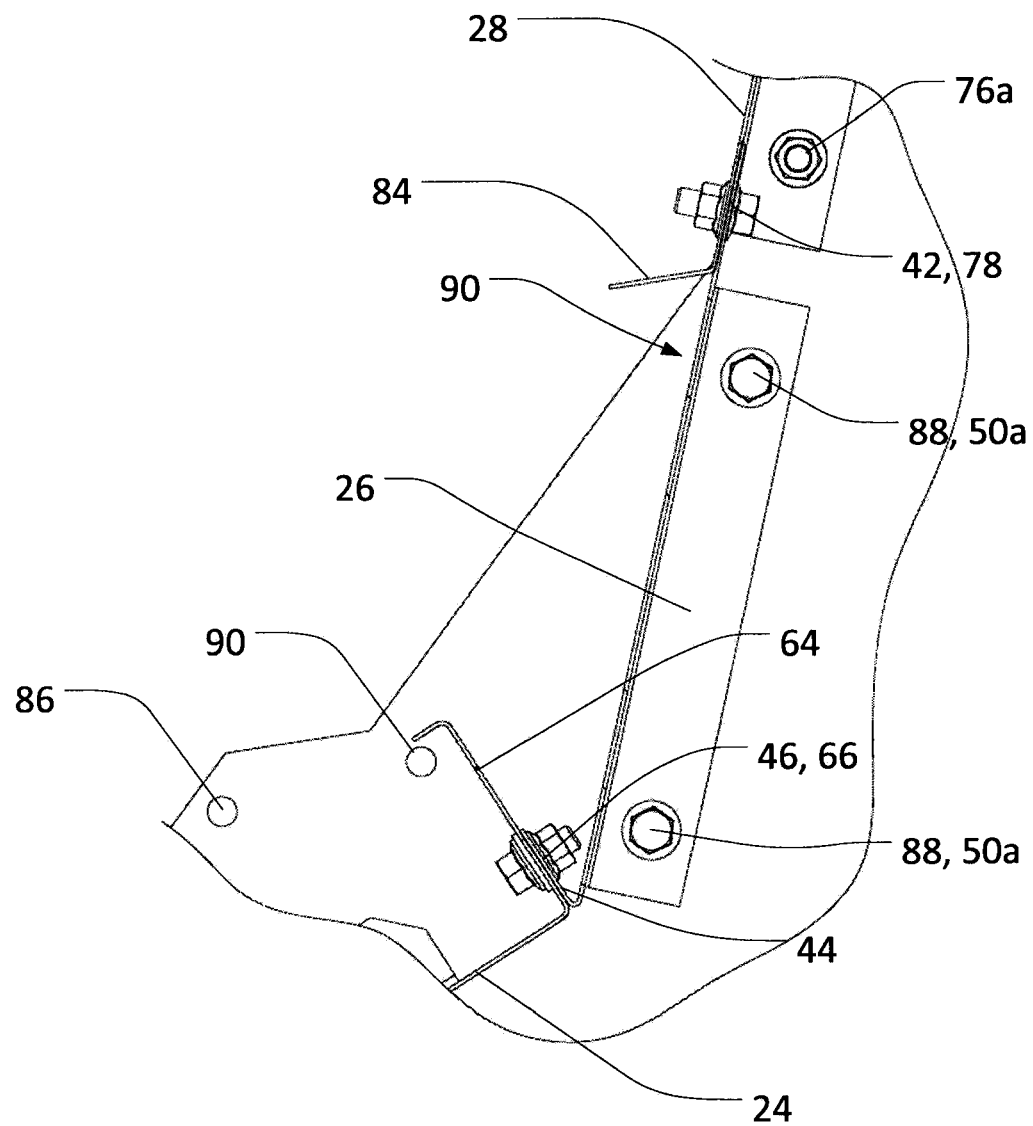
FIG. 11 is an enlarged view of region C-C indicated in FIG. 10.

Referring also to FIGS. 10 and 11, a first configuration of panels 24, 26 and 28 in duct 14 is depicted. As can be seen in FIG. 10, side walls of duct 14 may have various mounting connections corresponding to various mounting connections on panels 24, 26, and 28. For example, duct 14 may include mounting holes 84b, 86, 88, and 90, which may be configured to receive a bolt or pin to secure one or more of panels 24, 26, and 28 to duct 14. Duct 14 may also include, for example, slot 84a, which may be configured to receive a bolt or pin at various locations along slot 84a in order to secure one or more of panels 24, 26, and 28 to duct 14. In certain configurations, pairs of the above-noted mounting connections may be spaced to correspond to pairs of mounting connections on one or more of panels 24, 26, and 28. For example, mounting holes 86 on duct 14 may be spaced with the same distance as mounting holes 56a and 60a of panel 24, and mounting hole 84b and slot 84a may be spaced with the same distance as mounting holes 60a and 58a. In this way, panel 24 may be mounted to duct 14 in a first orientation using a combination of mounting holes 58a, 60a, and 84b and slot 84a (and various pins or bolts, and so on), and may be mounted to duct 14 in a second orientation using a combination of mounting holes 56a, 60a and 86. Likewise, panel 26 may be mounted to duct 14 in a first orientation using a combination of mounting holes 88 and 50a, and may be mounted to duct 14 in a second orientation using a combination of mounting holes 90 and 50a. Panel 28 may also be similarly mounted. (It will be understood that mounting via holes 56b, 58b, 50b, and so on, may proceed similarly. It will also be understood that various other configurations of mounting holes, slots and so on may also be possible, in order to permit various mounting configurations of panels 24, 26, 28.)

In the first orientation referenced above, as depicted in FIGS. 10 and 11, panel 26 may be mounted to panel 24 via tab 44 and bracket 64. For example, a bolt or pin may secure panel 26 to panel 24 via mounting holes 46 and 66 on panels 26 and 24, respectively. At its other end, panel 26 may be mounted to panel 28 via mounting holes 42 and 78 on panels 26 and 28, respectively. In this way, due to the angles between bracket 64 and wall 52a and between tab 44 and surface 40a, and the parallel (or other) relationship between the portions of surfaces 40a and 72a that include, respectively, mounting holes 42 and 78, a first angle may be formed between panels 24 and 26, with a corresponding turning angle for separation turn 38. As depicted, for example, the configuration of FIGS. 10 and 11 may be a relatively tight separation turn (i.e., a turn of smaller flow area and turning radius) suited for lower crop-flow conditions.

Figure 12:
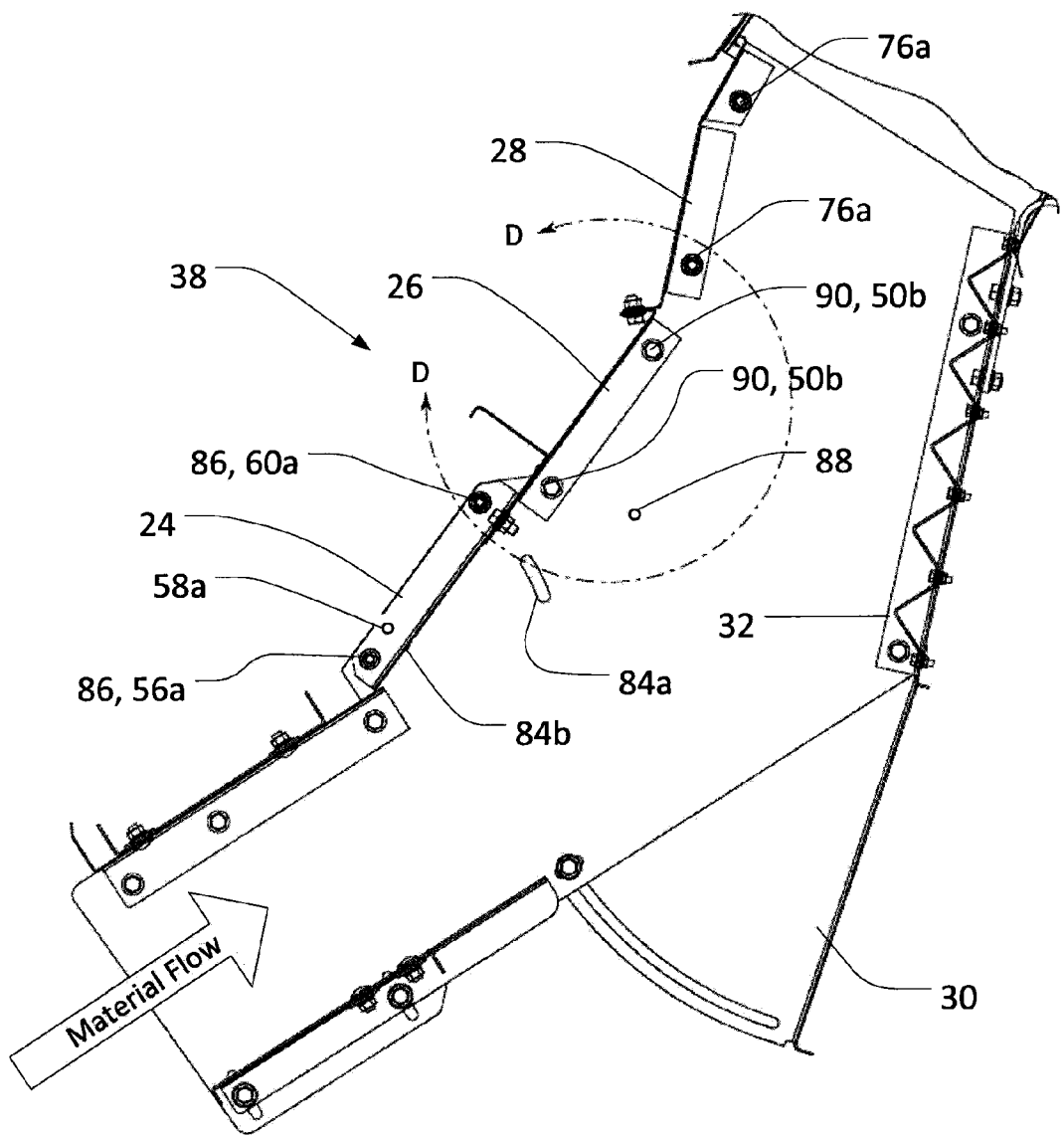
FIG. 12 is an enlarged view of region B-B indicated in FIG. 3, with the example duct wall sections of FIGS. 4-9 in a second configuration.
Figure 13:
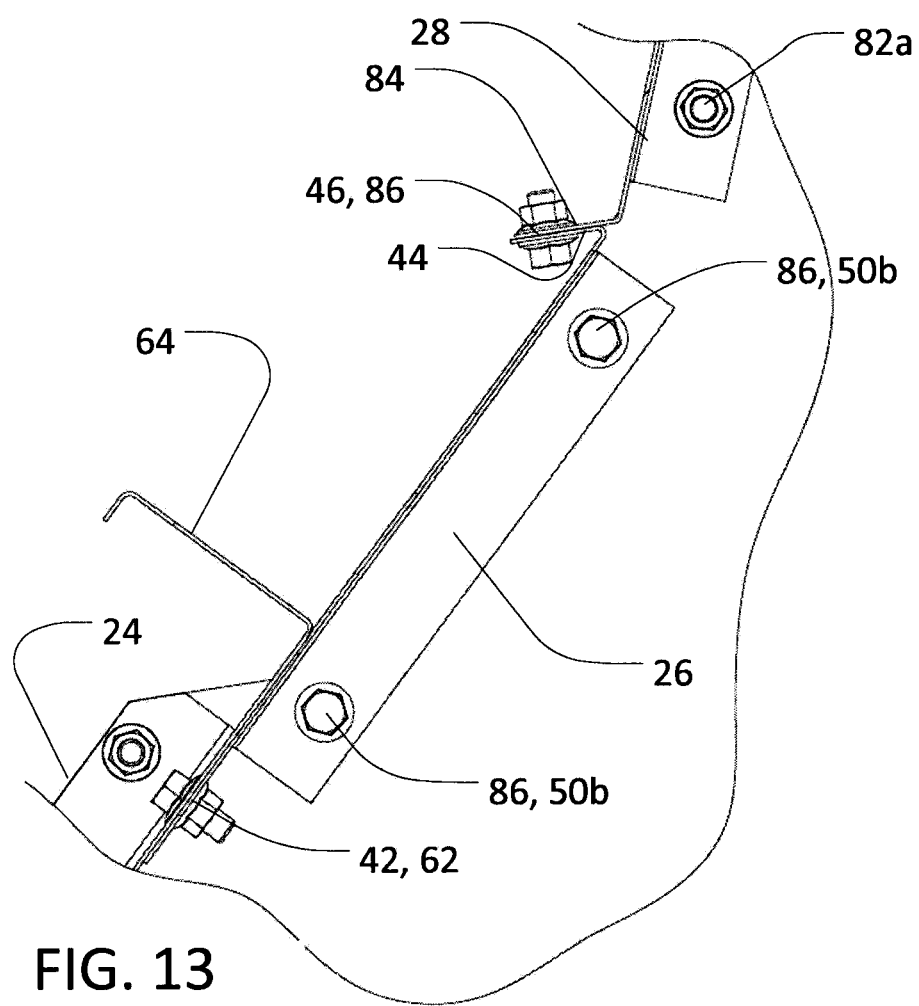
FIG. 13 is an enlarged view of region D-D indicated in FIG. 12.

Referring also to FIGS. 12 and 13, a second configuration of panels 24, 26 and 28 in duct 14 is depicted. As also noted above, by way of the various mounting holes and slots on the walls of duct 14, panel 24 may be mounted to duct 14 in a first orientation using a combination of mounting holes 58a, 60a, and 84b and slot 84a (and various pins or bolts, and so on), and may be mounted to duct 14 in a second orientation using a combination of mounting holes 56a, 60a and 86. Likewise, panel 26 may be mounted to duct 14 in a first orientation using a combination of mounting holes 88 and 50a, and may be mounted to duct 14 in a second orientation using a combination of mounting holes 90 and 50a. Panel 28 may also be similarly mounted. (It will be understood that mounting via holes 56b, 58b, 50b, and so on, may proceed similarly. It will also be understood that various other configurations of mounting holes, slots and so on may also be possible, in order to permit various mounting configurations of panels 24, 26, 28.)

In the second orientation referenced above, as depicted in FIGS. 12 and 13, panel 26 may be mounted to panel 24 via mounting holes 42 and 62 on panels 26 and 24, respectively. For example, a bolt or pin may secure panel 26 to panel 24 via mounting holes 42 and 62. At its other end, panel 26 may be mounted to panel 28 via mounting holes tabs 44 and 84 on panels 26 and 28, respectively (e.g., using bolts or pins, and so on). In this way, due to the angles between tab 84 and wall 72a and between tab 44 and surface 40a, and the parallel (or other) relationship between the portions of surfaces 40a and 52a that include, respectively, mounting holes 42 and 62, a second angle may be formed between panels 24 and 26, with a corresponding second turning angle for separation turn 38. As depicted, for example, the configuration of FIGS. 12 and 13 may be a relatively wide separation turn (i.e., a turn of larger flow area and turning radius) suited for higher crop-flow conditions.

It will be understood that various other turning angles (or radii) may be effected using various configurations of the tabs, mounting holes, and other mounting connections of panels 24, 26, and 28. Further, it will be understood that various other geometries for panels 24, 26, and 28 may be possible, including curved or bent geometries, which may result in other configurations of separation turn 38.

In certain embodiments, automatic adjustment of flow duct geometry may be possible. Such automatic adjustment may be implemented in a variety of ways. Generally, for example, a flow sensor may gather information regarding the flow of material through a duct and an adjustment device may be commanded, via a controller (e.g., a computing device having a variety of processors and memory architectures), to adjust aspects of duct geometry accordingly. Various embodiments of automatic control are presented below. It will be understood that other configurations may also be possible, in keeping with the principles of this disclosure. It will also be understood that various aspects of the embodiments specifically discussed (e.g., actuation mechanisms and configurations, geometric relationships, mounting connections, and so on) may be combined in various ways to facilitate useful control of duct geometry.

Referring also to FIGS. 14 and 15, in one embodiment duct wall section 100 may be rotatably connected (e.g., pinned or hinged) to duct 14 and to duct wall section 102. Duct wall section 102 may, in turn, be rotatably connected to duct wall section 104, which may be slidably connected to duct 14. Piston device 106 may be configured to impart a motive force to wall section 104 (e.g., via a pinned connection of a shaft of piston device 106 to tab 108 of wall section 104). In such a configuration, flow sensor 110 may detect various information regarding the flow of material through duct 14 and piston device 106 may be commanded, via controller 112, to move wall section 104 accordingly. For example, if sensor 110 detects an increased material flow rate, controller 112 may accordingly command piston device 106 to move wall section 104 from the orientation of FIG. 14 to the orientation of FIG. 15. By principles of geometry, this movement of wall section 104 will correspond to outward movement of wall sections 100 and 102 (as indicated by arrows in FIG. 14) to provide the larger flow area (and larger effective turning radius for separation turn 38) of FIG. 15.

Although various examples herein (including in discussion of FIGS. 14 and 15, above) may describe sensor 110 as directly detecting crop flow through duct 14, it will be understood that other sensors (and sensed information) may also be utilized. For example, information regarding vehicle speed, crop yield, field or crop conditions, and so on, may be used to derive crop flow information, which may then be utilized by controller 112 to command adjustment of the geometry of duct 14. Also, for clarity of presentation, sensor 110 and controller 112 may not be explicitly shown in FIGS. 15-25. It will be understood, however, that these components may also be included in the mechanisms depicted in those figures. It will be understood that in this example embodiment, and others, various other devices may also be used in place of piston device 106 in order to provide motive force. For example various servo motors, hydraulic pumps, electric machines, and so on may be provided.

Referring also to FIGS. 16 and 17, a similar configuration of duct wall sections may be employed with a geared adjustment device. For example, duct wall section 120 may be rotatably mounted to both of duct wall sections 122 and 124. Duct wall section 124 may include a gear-engaging structure (e.g., a toothed rack) for engaging with gear 126. Gear 126 may be driven by a motor (not shown), which may be controlled by controller 112 (not shown) based upon information from sensor 110 (not shown). In this way, gear 126 may move wall section 124 (via engagement with the toothed rack of wall section 124) along duct 14. This, in turn, may cause an adjustment of the angle between wall sections 120 and 122 and, accordingly, an adjustment of the flow geometry of duct 14 (and separation turn 38). For example, beginning from the orientation of FIG. 16, rotation of gear 126 in the clockwise direction may cause wall section 124 to slide along duct 14 in the upstream direction. By principles of geometry, this may cause wall sections 120 and 122 to move outwards, including to the widened flow geometry depicted in FIG. 17.

Figure 18:
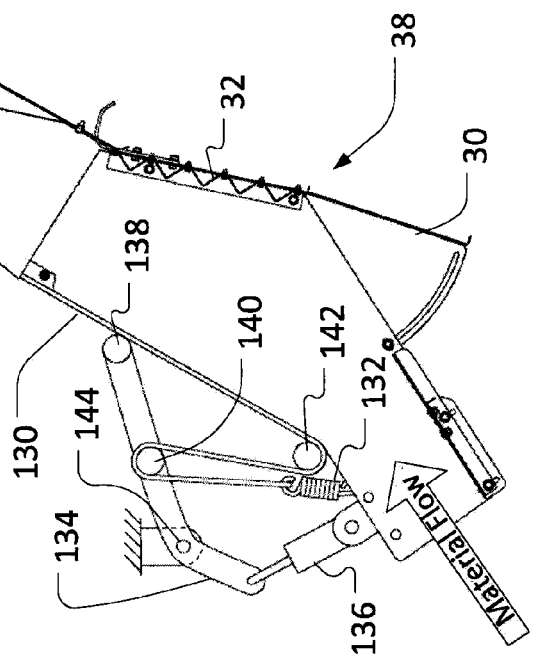
FIGS. 18 and 19 are cross-sectional views of the duct of FIG. 2, taken along plane A-A indicated in FIG. 2, showing a third example automated flow area adjustment device.
Figure 19:
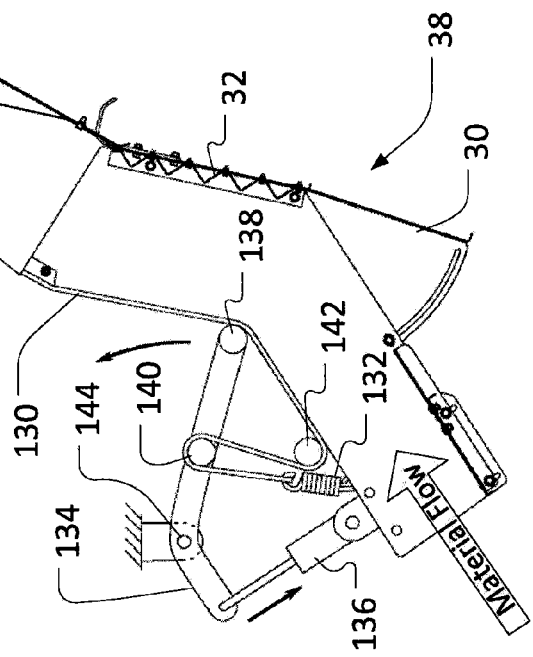

Referring also to FIGS. 18 and 19, in certain embodiments a flexible duct wall and one or more pivot members may be utilized. For example, flexible duct wall 130 (e.g., a flexible rubber or plastic sheet) may extend from the upstream end of separation turn 38 to the downstream end of the turn (or between various other locations in duct 14). In certain embodiments, a tension element (e.g., tension spring 132) may be employed to maintain a desired amount of tension on duct wall 130. Pivot member 134 (e.g., a stamped or machined metal arm) may be pivotably mounted at pivot point 144, with one end engaged by piston device 136 and the other end (e.g., equipped with roller 138 or similar device) in contact with duct wall 130. In certain embodiments, additional roller 140 (or similar device) may be provided, with the flexible material of duct wall 130 extending from tension spring 132, and around roller 140 and roller 142 before tracing the upper boundary of separation turn 38. Piston device 136 may be in communication with controller 112 (not shown). In this way, starting from the configuration of FIG. 18, piston 136 may retract (e.g., based upon a signal from controller 112 that is, in turn, based upon information from sensor 110 (not shown)), thereby pivoting member 134 around pivot point 144. This may simultaneously pull the material of wall 130 upwards at roller 140 while reducing pressure on wall 130 at roller 138. As a result, wall 130 may move generally outwards, including to the configuration depicted in FIG. 19, in order to increase the flow area of turn 38.

Referring also to FIGS. 20 and 21, in certain embodiments additional pivot members may also be employed. For example, pivot member 150 may be pivotably mounted at pivot point 152 upstream of turn 38 and may include rollers 154 (or similar devices) at one end. Rollers 154 (or other similar devices) may provide a passage for the material of wall 130, with the material passing between rollers 154, around anchor point 160 (e.g., configured as another roller) and then back through rollers 154. Piston device 156 may be mounted to duct 14 and configured to move pivot member 150 (e.g., via rotatably connection to tab 158 of member 150) based upon input from controller 112 and sensor 110 (not shown). In this way, starting from the configuration of FIG. 20, as piston device 136 retracts (e.g., as commanded by controller 112) piston device 156 may also retract (e.g., as also commanded by controller 112), causing member 150 to pivot away from duct 14 around pivot point 152. This may cause rollers 154 to move toward anchor point 160, thereby decreasing the amount of material of wall 130 that is held between rollers 154 and anchor point 160 and, correspondingly, increasing the amount of material of wall 130 that is available to actually contain the material within duct 14. As a result, wall 130 may generally define a larger flow area for duct 14. It will be understood that the various pivot members of FIGS. 20 and 21 (i.e. pivot members 134 and 150) may be used together (e.g., as depicted) or separately (not shown for pivot member 150).

Figure 22:
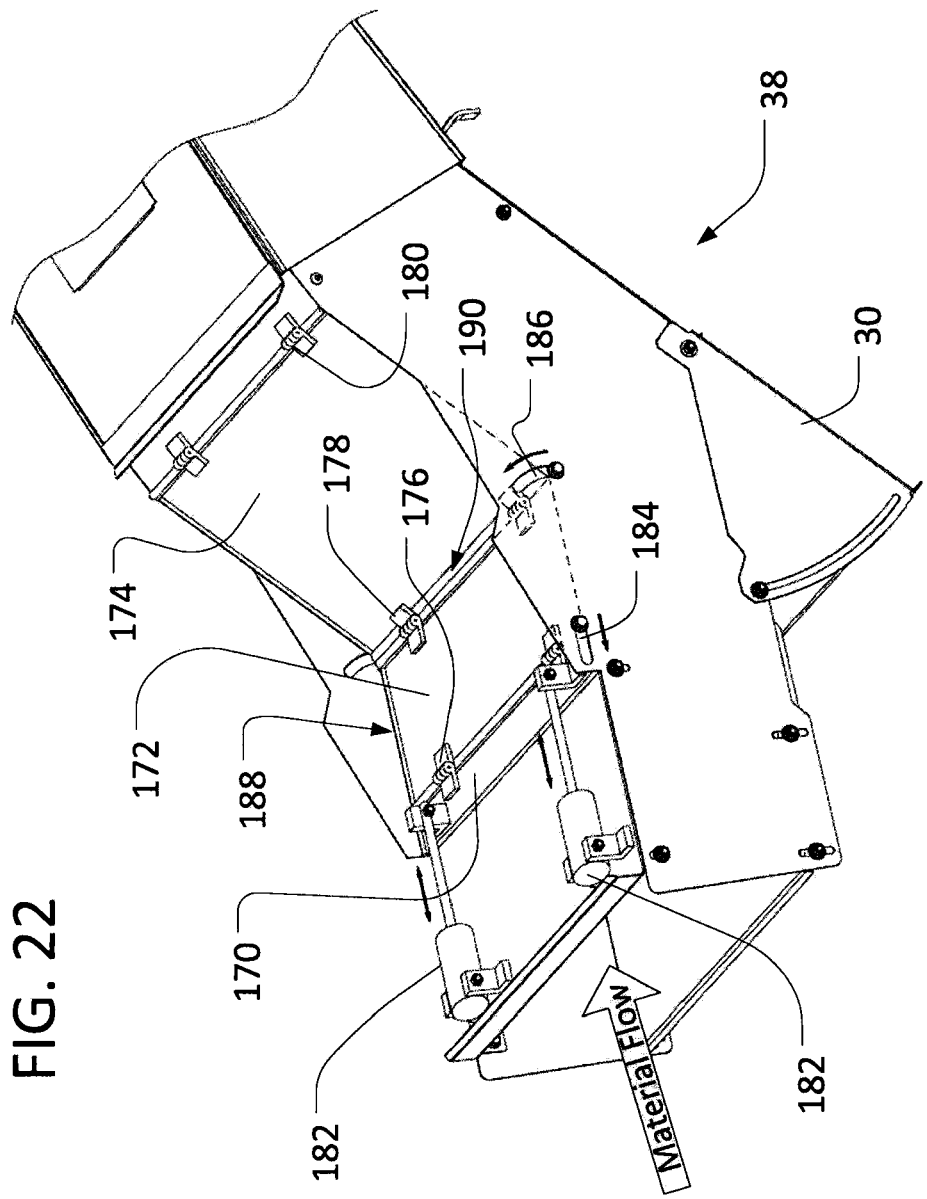
FIG. 22 is a perspective view of a lower portion of the duct of FIG. 2, showing a fifth example automated flow area adjustment device.

Referring also to FIG. 22, in certain embodiments wall sections 170, 172 and 174 (e.g., sheet metal wall sections) may be rotatably connected in series (e.g., via hinges 176 and 178). Wall section 174 may be rotatably mounted to duct 14 (e.g., via hinges 180), and section 170 may be slidably connected to duct 14 (e.g., via pins extending through slots 184 in the side walls of duct 14). Wall section 172 (or wall section 174) may also be slidably connected to duct 14 (e.g., via pins extending through slots 186 in the side walls of duct 14). Piston devices 182 may be configured to slide wall section 170 along slots 184 based upon input from controller 112 (and sensor 110), which may in turn cause wall section 172 (or wall section 174) to slide along slots 186, thereby causing a change in the angle between wall sections 172 and 174 and a corresponding change in the flow geometry of separation turn 38.

It will be understood, for various embodiments of a flow area adjustment device, that it may be useful to provide flexible or slidable seals between various components of duct 14. For example, slidable seals of various known configurations may be provided along junction 188 between wall section 172 and the side wall of duct 14. Likewise, flexible seals of various known configurations may be provided along junction 190 between wall sections 172 and 174. It will be understood that various types of seals may be used, and that seals may be utilized in a variety of locations in various of the embodiments discussed herein.

Referring also to FIGS. 23-25, in certain embodiments, duct ceiling portions 200 and 202 may be provided. Portion 200 may be rotatably mounted to duct 14 (e.g., via pinned connection 204) and may include side wall extensions 206 on either side of portion 200. Likewise, portion 202 may be rotatably mounted to duct 14 (e.g., via pinned connection 208) and may include side wall extensions 210 on either side of portion 202. Piston device 212 may be mounted to duct 14 and rotatably connected to portion 202, and piston device 214 may be mounted to duct 14 and rotatably connected to portion 200. Each of piston devices 212 and 214 may be in communication with controller 112 (not shown) or with sensor 110 (not shown). In this way, based upon a command from controller 112 (e.g., as based, in turn, on information from sensor 110), piston devices 212 and 214 may cause ceiling portions 200 and 202 to move from the orientation of FIG. 23 to the orientation of FIG. 24, with the corresponding increase of flow area (and increase in effective turning radius) in separation turn 38. As can be seen in FIG. 24, as ceiling portions 200 and 202 are moved outward side wall extensions 206 and 210 may overlap, in order to appropriately contain material moving through duct 14. As can be seen in FIG. 25, additional side wall sections 216 of duct 14 may also overlap with side wall extensions 206 (and 210 (not shown in FIG. 25)) to further ensure appropriate containment of material within duct 14.

As generally depicted in the various figures, devices for adjusting flow area of duct 14 may usefully be employed at or near separation turn 38 of duct 14. It will be understood, however, that these devices (and others contemplated by this disclosure) may be utilized in various other locations in duct 14 (e.g., at locations downstream of port 34) as well as in various other duct (and vehicle) types.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A flow area adjustment device for a duct with variable flow area, the flow area adjustment device comprising:
   a first duct wall section bounding, at least in part, a flow channel of the duct over a first flow region, the first duct wall section having a first and a second mounting position with respect to the duct; and
   a second duct wall section bounding, at least in part, the flow channel of the duct over a second flow region adjacent the first flow region, the second duct wall section having a first end with a first mounting connection and a second end with a second mounting connection angled with respect to the first mounting connection, each of the first and the second mounting connections being configured to mount the second duct wall section to one or more of the first duct wall section and a third duct wall section adjacent the second duct wall section;
   wherein, with the first duct wall section in the first mounting position, the second duct wall section is mounted to the first duct wall section via the first mounting connection and is mounted to the third duct wall section via the second mounting connection, whereby the first duct wall section and the second duct wall section form a first angle in the flow channel; and
   wherein, with the first duct wall section in the second mounting position, the second duct wall section is mounted to the first duct wall section via the second mounting connection and is mounted to the third duct wall section via the first mounting connection, whereby the first duct wall section and the second duct wall section form a second angle in the flow channel that is different from the second angle.

2. The flow area adjustment device of claim 1, wherein the flow channel includes a separation flow channel for a cotton processing vehicle.

3. The flow area adjustment device of claim 2, wherein a portion of one or more of the first duct wall section and the second duct wall section are located on a ceiling of the separation flow channel above a trash outlet of the separation flow channel.

4. The flow area adjustment device of claim 1, wherein the third duct wall section includes a third mounting connection angled with respect to the flow channel at the third duct wall section, the second and third duct wall sections being mounted together via the third mounting connection and the first mounting connection when the first duct wall section is in the second mounting position and the second duct wall section is mounted to the first duct wall section via the second mounting connection.

5. The flow area adjustment device of claim 1, wherein in the first mounting position the first duct wall section is mounted to a side wall of the duct at a first location and in the second mounting position the first duct wall section is mounted to the side wall of the duct at a second location different from the first location.

6. The flow area adjustment device of claim 1, wherein the first duct wall section includes a bracket extending away from the flow channel, the first duct wall section being mounted to the second duct wall section via the bracket and the first mounting connection of the second duct wall section when the first duct wall section is in the first mounting position.

7. The flow area adjustment device of claim 1, wherein, with the first duct wall section in the second mounting position and the second duct wall section mounted to the first duct wall section via the second mounting connection, the first duct wall section is substantially parallel to the second duct wall section.

8. The flow area adjustment device of claim 1, wherein one or more of the first duct wall section, the second duct wall section, and the third duct wall section are formed from sheet metal; and
   wherein the second mounting connection is angled at an acute angle with respect to the first mounting connection.

9. A flow area adjustment device for a duct of a material-conveying machine, the duct having a variable flow area, the flow area adjustment device comprising:
   a first duct wall section including a first flow channel surface bounding, at least in part, a flow channel of the duct over a first flow region, the first duct wall section having a first and a second mounting position with respect to the duct;
   a second duct wall section including a second flow channel surface bounding, at least in part, the flow channel of the duct over a second flow region adjacent the first flow region, the second duct wall section further including a first mounting tab angling away from the second flow channel surface, and a first mounting connection parallel, at least in part, to the second flow channel surface; and
   a third duct wall section including a third flow channel surface bounding, at least in part the flow channel of the duct over a third flow region adjacent the second flow region, the third duct wall section further including a second mounting tab angling away from the third flow channel surface, and a second mounting connection parallel, at least in part, to the third flow channel surface;
   wherein, with the first duct wall section in the first mounting position, the second duct wall section is mounted to the first duct wall section via the first mounting tab and is mounted to the third duct wall section via the first mounting connection and the second mounting connection, whereby the first duct wall section and the second duct wall section form a first angle in the flow channel; and
   wherein, with the first duct wall section in the second mounting position, the second duct wall section is mounted to the first duct wall section via the first mounting connection and is mounted to the third duct wall section via the first mounting tab and the second mounting tab, whereby the first duct wall section and the second duct wall section form a second angle in the flow channel different from the first angle.

10. The flow area adjustment device of claim 9, wherein the flow channel includes a separation flow channel of the material-conveying machine, and a portion of one or more of the first duct wall section and the second duct wall section are located on a ceiling of the separation flow channel above a trash outlet of the separation flow channel.

11. The flow area adjustment device of claim 9, wherein the first duct wall section includes a bracket extending away from the flow channel, the first duct wall section being mounted to the second duct wall section via the bracket and the first mounting tab when the first duct wall section is in the first mounting position.

12. The flow area adjustment device of claim 9, wherein in the first mounting position the first duct wall section is mounted to a side wall of the duct at a first location and in the second mounting position the first duct wall section is mounted to the side wall of the duct at a second location different from the first location.

13. The flow area adjustment device of claim 9, wherein, with the first duct wall section in the second mounting position and the second duct wall section mounted to the first duct wall section via the first mounting connection, the first flow channel surface is substantially parallel to the second flow channel surface.

14. A flow area adjustment device for a duct with variable flow area, the flow area adjustment device comprising:
   a flow sensor;
   a controller;
   a first duct wall section bounding, at least in part, a flow channel of the duct over a first flow region;
   a second duct wall section bounding, at least in part, the flow channel of the duct over a second flow region adjacent the first flow region; and
   a duct wall adjustment device configured to change the orientation of one or more of the first and the second duct wall sections based upon, at least in part, input from the flow sensor and the controller.

15. The flow area adjustment device of claim 14, further comprising:
   a rotatable connection between the first and the second duct wall sections;
   a third duct wall section rotatably mounted to the second duct wall section and slidably mounted to the duct; and
   a piston device included in the duct wall adjustment device, the piston device being configured to controllably move the third duct wall section along the slidable mounting of the third wall section to the duct based upon, at least in part, the input from the flow sensor and the controller;
   wherein at a first extension of the piston device the first and the second duct wall sections form a first angle in the flow channel; and
   wherein at a second extension of the piston device the first and the second duct wall sections form a second angle in the flow channel that is different from the first angle.

16. The flow area adjustment device of claim 14, further comprising:
   a rotatable connection between the first and the second duct wall sections;
   a third duct wall section rotatably mounted to the first duct wall section and slidably mounted to the duct, the third wall section including a gear-engaging structure; and
   a driven gear engaged with the gear-engaging structure of the third wall section, the driven gear being configured to controllably move the third duct wall section along the slidable mounting of the third wall section to the duct based upon, at least in part, the input from the flow sensor and the controller;
   wherein at a first position of the third duct wall section the first and the second duct wall sections form a first angle in the flow channel; and
   wherein at a second position of the third duct wall section the first and the second duct wall sections form a second angle in the flow channel that is different from the first angle.

17. The flow area adjustment device of claim 14, further comprising:
   a flexible duct wall including the first and the second duct wall sections;
   a first piston device included in the duct wall adjustment device;
   a first pivoting member in contact at a first end of the pivoting member with the flexible duct wall, the contact of the first end of the first pivoting member with the flexible duct wall separating the first duct wall section from the second duct wall section, the first pivoting member being mounted to the first piston device at a second end of the first pivoting member and to a first pivot mount at a first pivot point between the first and the second ends of the first pivoting member;

wherein, at a first extension of the first piston device based upon, at least in part, the input from the flow sensor and the controller, the first pivoting member causes the first and the second duct wall sections to form a first angle in the flow channel; and wherein, at a second extension of the first piston device based upon, at least in part, the input from the flow sensor and the controller, the first pivoting member causes the first and the second duct wall sections to form a second angle in the flow channel that is different from the first angle.

18. The flow area adjustment device of claim 17, further comprising:

a second piston device included in the duct wall adjustment device;

a second pivoting member including a passage for the flexible duct wall at a third end of the second pivoting member, the flexible duct wall passing from the flow channel through the passage and around an anchor point that is opposite the passage from the flow channel, the second pivoting member being mounted to a second pivot mount at a fourth end of the second pivoting member and to a second piston device between the third and the fourth ends of the second pivoting member;

wherein, at a third extension of the second piston device based upon, at least in part, the input from the flow sensor and the controller, the second pivoting member causes a first length of the flexible duct wall to be held between the anchor point and the passage; and wherein, at a fourth extension of the second piston device based upon, at least in part, the input from the flow sensor and the controller, the second pivoting member causes a second length of the flexible duct wall to be held between the anchor point and the passage.

19. The flow area adjustment device of claim 14, further comprising:

a first slidable connection between the first duct wall section and the duct and a second slidable connection between the first duct wall section and the duct, the first slidable connection allowing the first duct wall section to slide in a first direction with respect to the duct and the second slidable connection allowing the first duct wall section to slide in a second direction with respect to the duct;

one or more piston devices included in the duct wall adjustment device, the one or more piston devices configured to move the first duct wall section along one or more of the first and the second slidable connections;

a first rotatable connection between the first duct wall section and the second duct wall connection; and a second rotatable connection between the second duct wall section and the duct;

wherein at a first extension of the one or more piston devices based upon, at least in part, the input from the flow sensor and the controller, the first and the second rotatable connections and the first and the second slidable connections cause the first and the second duct wall sections to form a first angle in the flow channel; and wherein at a second extension of the one or more piston devices based upon, at least in part, the input from the flow sensor and the controller, the first and the second rotatable connections and the first and the second slidable connections cause the first and the second duct wall sections to form a second angle in the flow channel that is different from the first angle.

20. The flow area adjustment device of claim 14, further comprising:

a first duct ceiling section and a first side wall extension, each included in the first duct wall section, a first end of the first duct wall section being rotatably mounted to the duct;

a second duct ceiling portion and a second side wall extension, each included in the second duct wall section, a second end of the second duct wall section being rotatably mounted to the duct;

a first piston device included in the duct wall adjustment device, the first piston device being fixed with respect to the duct at a first location, and mounted to the first duct wall section; and a second piston device included in the duct wall adjustment device, the second piston device being fixed with respect to the duct at a second location, and mounted to the second duct wall section;

wherein, at a first extension of the first and the second piston devices based upon, at least in part, the input from the flow sensor and the controller, the first and the second duct wall sections form a first angle in the flow channel;

wherein, at a second extension of the first and the second piston devices based upon, at least in part, the input from the flow sensor and the controller, the first and the second duct wall sections form a second angle in the flow channel that is different from the first angle; and wherein, at the second extension of the first and the second piston devices, the first side wall extension overlaps with the second side wall extension.

* * * * *